US011811610B2

(12) United States Patent
Mutnuru et al.

(10) Patent No.: US 11,811,610 B2
(45) Date of Patent: Nov. 7, 2023

(54) METHOD AND APPARATUS FOR HOLISTIC RENDERING OF CLOUD NETWORK CONFIGURATION

(71) Applicant: Oracle International Corporation, Redwood Shores, CA (US)

(72) Inventors: Rishi Kaundinya Mutnuru, San Jose, CA (US); Iain Roger Cadd, Dalkeith (GB)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 17/146,191

(22) Filed: Jan. 11, 2021

(65) Prior Publication Data

US 2022/0217052 A1 Jul. 7, 2022

Related U.S. Application Data

(60) Provisional application No. 63/132,059, filed on Dec. 30, 2020.

(51) Int. Cl.
*H04L 41/12* (2022.01)
*H04L 41/0866* (2022.01)

(52) U.S. Cl.
CPC .......... *H04L 41/12* (2013.01); *H04L 41/0866* (2013.01)

(58) Field of Classification Search
CPC ............................ H04L 41/12; H04L 41/0866
See application file for complete search history.

(56) References Cited

U.S. PATENT DOCUMENTS

| | | | | |
|---|---|---|---|---|
| 6,973,488 | B1 | 12/2005 | Yavatkar et al. | |
| 8,402,147 | B2 | 3/2013 | Bondy et al. | |
| 9,576,092 | B2 | 2/2017 | Platzker et al. | |
| 9,760,391 | B2 | 9/2017 | Kiess et al. | |
| 10,200,248 | B1 | 2/2019 | Jiang et al. | |
| 10,382,272 | B1 | 8/2019 | Simaria et al. | |
| 10,951,431 | B1 * | 3/2021 | Raman | H04L 41/0856 |
| 2005/0114479 | A1 | 5/2005 | Watson-Luke | |
| 2007/0113273 | A1 | 5/2007 | Shafer et al. | |
| 2013/0073486 | A1 * | 3/2013 | Petrick | H04L 41/22 706/12 |

(Continued)

OTHER PUBLICATIONS

Bjorklund, "Yang—A Data Modeling Language for the Network Configuration Protocol (NETCONF)", Internet Engineering Task Force (IETF), RFC 6020, Oct. 2010, 173 pages.

(Continued)

*Primary Examiner* — Jae Y Lee
(74) *Attorney, Agent, or Firm* — Kilpatrick Townsend & Stockton LLP

(57) ABSTRACT

The present is directed to systems, methods, and devices for holistic rendering of cloud network configuration. The method can include receiving data characterizing a plurality of devices in a computing network. The method can include generating with the inventory processor a data file characterizing each of the plurality of devices in the computing network. This data file can be generated based on the received data and on a set of static overrides. The method can include generating a configuration file for each of the plurality of devices in the computing network via iterative selection and application of templates to portions of the data file.

18 Claims, 19 Drawing Sheets

(56) References Cited

U.S. PATENT DOCUMENTS

| | | | | |
|---|---|---|---|---|
| 2013/0170348 | A1* | 7/2013 | Luna | H04W 28/12 370/230.1 |
| 2016/0342722 | A1 | 11/2016 | Sentieys et al. | |
| 2018/0234298 | A1* | 8/2018 | Cohn | H04L 41/122 |
| 2019/0258756 | A1* | 8/2019 | Minwalla | G06F 30/20 |
| 2020/0106664 | A1* | 4/2020 | Kapur | H04L 41/12 |
| 2020/0110793 | A1* | 4/2020 | Sullivan | G06F 40/14 |

OTHER PUBLICATIONS

Enns, "NETCONF Configuration Protocol", RFC 4741, Network Working Group, Dec. 2006, 95 pages.

Harrington et al., "An Architecture for Describing Simple Network Management Protocol (SNMP) Management Frameworks", RFC 3411, Network Working Group, Dec. 2002, 64 pages.

* cited by examiner

400

METHOD AND APPARATUS FOR HOLISTIC RENDERING OF CLOUD NETWORK CONFIGURATION

CROSS-REFERENCE TO RELATED APPLICATION

This application claims the benefit of U.S. Provisional Application No. 63/132,059, filed on Dec. 30, 2020, and entitled "Method And Apparatus For Holistic Rendering Of Cloud Network Configuration", the entirety of which is hereby incorporated by reference herein.

TECHNICAL FIELD

The present disclosure relates generally to networking, and more particularly to techniques for setting up and managing networks, such as CLOS networks, for a cloud services provider.

BACKGROUND

Data centers play an important role in modern software technology. Data centers frequently employ multiple servers connected interconnected via a switch architecture. Via this switch architecture, the servers are able to communicate with each other, as well as communicate with devices outside of the data center.

Such switch architectures have evolved and improved over time. Some of these improvements have included a change in architecture from tree architectures to more modern, spine-and-leaf architectures. These modern architectures provide significant benefits, including decreased and consistent latency.

These improvements in data center architecture have been driven, in part, by ever increasing needs for processing capability and increased processing speeds. Increasing processing demands have resulted in the growth of data centers, and specifically in the growth in the number of servers a switches forming the data center. Due to this growth, further improvements to the creation, control, and operation of data centers are desired.

BRIEF SUMMARY

One aspect of the present disclosure relates to a method. The method includes receiving data characterizing a plurality of devices in a computing network, generating with the inventory processor a data file characterizing each of the plurality of devices in the computing network, the data file generated based on the received data and on a set of static overrides, generating a configuration file for each of the plurality of devices in the computing network via iterative selection and application of templates to portions of the data file.

In some embodiments, the data characterizing the plurality of devices in the computing network is received from a plurality of databases. In some embodiments, the data characterizing the plurality of devices in the computing network characterizes a topology of the computing network. In some embodiments, the computing network can be a Clos network. In some embodiments, the data file characterizing each of the plurality of devices in the computing network can be a JSON file.

In some embodiments, generating the data file characterizing each of the plurality of devices in the computing network can include extracting portions of the received data relevant to one of the plurality of devices in the computing network, and generating a dictionary object for the one of the plurality of devices in the computing network. In some embodiments, generating the data file characterizing each of the plurality of devices in the computing network further includes identifying at least one of the set of static overrides relevant to the one of the plurality of devices in computing network, and merging the dictionary object for the one of the plurality of devices in the computing network with the at least one of the set of static overrides.

In some embodiments, the set of static overrides can include at least one of: a group override, and a device override. In some embodiments, the group override is applicable to a plurality of devices in the computing network belonging to a common group. In some embodiments, the device override is relevant to one device within the computing network. In some embodiments, the device override overwrites portions of the dictionary object when the device override conflicts with the group override.

In some embodiments, generating the configuration file for each of the plurality of devices in the computing network via iterative selection and application of templates to portions of the data file includes identifying roles identified in the data file, and for each role identified in the data file: identifying devices associated with the identified role, and generating a configuration file for each of the identified devices associated with the identified role. In some embodiments, generating the configuration file for each of the identified devices associated with the identified role includes selecting one of the identified devices associated with the identified role, identifying based on the data file at least one service associated with the selected one of the identified devices associated with the identified role, and retrieving a plugin linked with the identified at least one service associated with the selected one of the identified devices associated with the identified role.

In some embodiments, generating the configuration file for each of the identified devices associated with the identified role further includes ingesting information from the data file into the plugin, and outputting a configuration file segment relevant to the at least one service associated with the selected one of the identified devices associated with the identified role from the plugin. In some embodiments, generating the configuration file for each of the identified devices associated with the identified role further includes identifying a plurality of configuration file segments relevant to the selected one of the identified devices associated with the identified role, and merging the plurality of configuration file segments to form the configuration file.

One aspect of the present relates to a non-transitory computer-readable storage medium storing a plurality of instructions executable by one or more processors. The plurality of instructions when executed by the one or more processors cause the one or more processors to receive data characterizing a plurality of devices in a computing network, generate with the inventory processor a data file characterizing each of the plurality of devices in the computing network, the data file generated based on the received data and on a set of static overrides, and generate a configuration file for each of the plurality of devices in the computing network via iterative selection and application of templates to portions of the data file.

In some embodiments, generating the data file characterizing each of the plurality of devices in the computing network includes extracting portions of the received data relevant to one of the plurality of devices in the computing network, and generating a dictionary object for the one of the plurality of devices in the computing network. In some embodiments, generating the data file characterizing each of the plurality of devices in the computing network further includes identifying at least one of the set of static overrides relevant to the one of the plurality of devices in computing network, and merging the dictionary object for the one of the plurality of devices in the computing network with the at least one of the set of static overrides.

One aspect of the present relates to a system. The system includes a memory including a configuration database, and a processor. The processor can receive data characterizing a plurality of devices in a computing network, generate with the inventory processor a data file characterizing each of the plurality of devices in the computing network, the data file generated based on the received data and on a set of static overrides, generate a configuration file for each of the plurality of devices in the computing network via iterative selection and application of templates to portions of the data file, and save the configuration file in the configuration database.

In some embodiments, generating the data file characterizing each of the plurality of devices in the computing network includes extracting portions of the received data relevant to one of the plurality of devices in the computing network, generating a dictionary object for the one of the plurality of devices in the computing network, identifying at least one of the set of static overrides relevant to the one of the plurality of devices in computing network, and merging the dictionary object for the one of the plurality of devices in the computing network with the at least one of the set of static overrides.

Various embodiments are described herein, including methods, systems, non-transitory computer-readable storage media storing programs, code, or instructions executable by one or more processors, and the like.

The foregoing, together with other features and embodiments will become more apparent upon referring to the following specification, claims, and accompanying drawings.

DETAILED DESCRIPTION

Figure 1:
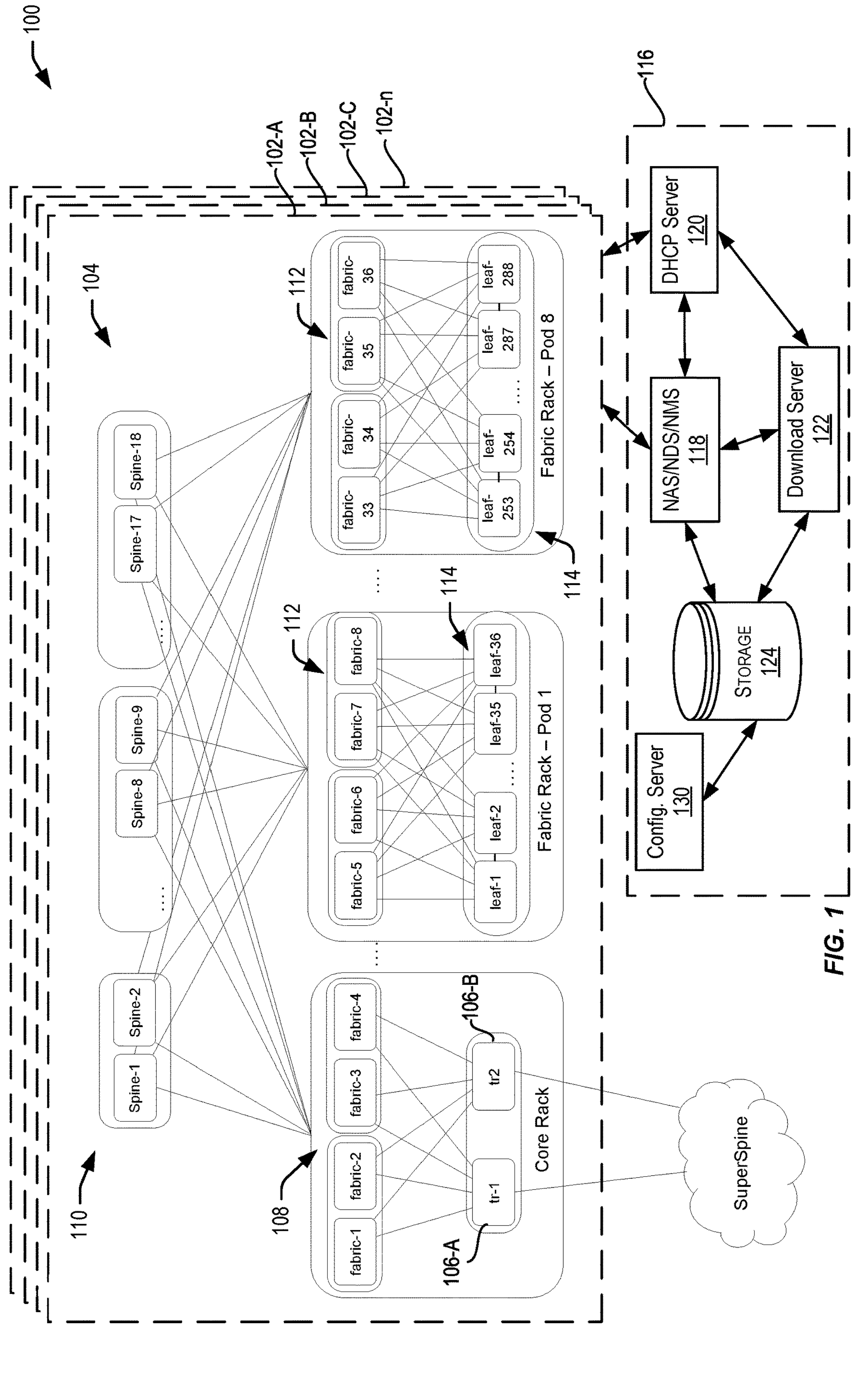
FIG. 1 depicts a simplified diagram of one embodiment of a network system.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

A cloud services provider (such as Oracle Corporation of Redwood Shores, Calif.) may provide one or more cloud services that can be subscribed to by customers (or subscribers) of the offered services. In order to provide these services, the cloud services provider may run thousands of applications in its cloud infrastructure. These thousands of applications may be executed by hundreds (or even more) of servers and the applications and servers need to communicate and exchange data with each other in the provision of the cloud services. As part of its cloud infrastructure, a cloud services provider thus has to build a robust and scalable network (or multiple networks) that are scalable and provide seamless experience to the subscribers for the applications. For example, it is desired that such a network support application ("app") continuity, application fluency, application optimization, and the like.

Such networks are generally quite complex with potentially hundreds, or thousands, or even more components. A typical cloud network for a cloud services provider comprises multiple routers and switches that are responsible for routing and handling of traffic between applications executed by servers within the infrastructure of the cloud services provider. The servers may be spread across one of more data centers. These applications may include applications that are accessed by subscribers (clients) of the cloud services.

CLOS (or Clos or CLoS) topology-based networks are currently commonly used by cloud service providers to implement their networks. A CLOS network is a multi-tiered network (e.g., 2-tiered, 3-tiered, etc.) comprising of multiple devices organized into tiers or layers. Each tier comprises one or more switches or routers. Switches, routers, and devices are used interchangeably herein in the context of the computing network. Thus, a "device" in the computing network can be a switch or router. A CLOS network specifies a hierarchy of devices connected to backend servers that may be executing the applications. Clos networks are popular because they offer deterministic or informed latency all the way from where the packet enters the network from a server to when it leaves the network. A Clos network also offers redundancy and high availability.

For example, a 2-tiered CLOS network comprises:

(1) An edge layer where network traffic enters and exits the CLOS network. The edge layer comprises leaf devices that may be connected to servers that execute the cloud applications. The edge layer provides an entry point for network traffic originating from servers connected to the leaf devices to enter the CLOS network. The edge layer also provides an exit point for network traffic to leave the CLOS network to intended destination servers. The edge layer thus includes an ingress stage comprising devices where the network traffic enters the CLOS network, and an egress stage comprising devices from which the network traffic exits the CLOS network and is communicated to destination servers.

(2) An aggregation layer connected to the edge layer devices. The aggregation layer comprises one or more spine devices. Spine devices may use Data Center Interconnect (DCI) technology that is used to connect two or more data centers together over short, medium or long distances using high-speed packet-optical connectivity. The aggregation layer provides connectivity between the ingress stage of the edge layer and the egress stage of the edge layer. An edge leaf device may be connected to one or more spine devices.

In a 2-tiered CLOS network, for communication between servers (e.g., between applications executed by the servers) in an AD, a packet originating from a source server (e.g., originating from an application executed by the source server) may be received by a leaf device (of the ingress stage) connected to the source server. The ingress stage leaf device may then forward the packet to an appropriate spine device, which in turn may forward the packet to an egress stage leaf device. The egress stage leaf device may then forward the packet to a server that is executing an application that is the intended destination of the packet.

A 3-tiered CLOS network may include:

(1) An edge layer as described above.

(2) An aggregation layer as described above.

(3) A fabric layer comprising fabric devices. A fabric layer generally sits between the edge layer and the aggregation layer (i.e., provides connectivity between leaf devices of the edge layer and the spine devices of the aggregation layer). In certain configurations, fabric devices may also be connected to one or more transit routers ("TR") that provide connectivity between availability domains. A leaf device may be connected to one or more fabric devices. The fabric layer increases the scalability of a CLOS network. For example, in a particular setup, leaf devices may have 10 Gig ports and fabric devices may have 40 Gig ports. In this setup, four leaf device ports or interfaces can be connected to one fabric device port. A fabric device may be connected to one or more spine devices.

In a 3-tiered CLOS network, for communication between servers (e.g., between applications executed by the servers) in an AD, a packet originating from a source server (e.g., originating from an application executed by the source server) may be received by a leaf device (of the ingress stage) connected to the source server. The ingress stage leaf device may then forward the packet to an appropriate fabric device, which may in turn forward the packet to a spine device. The spine device may then forward the packet to a fabric device, which in turn forwards the packet to an egress stage leaf device. The egress stage leaf device may then forward the packet to a server that is executing an application that is the intended destination of the packet.

For example, a cloud services provider may have cloud infrastructure in a particular region (e.g., San Jose). The infrastructure may spread across multiple buildings and multiple floors of a building. Each building may represent an availability domain ("AD"). Within a building, each floor of the building may host a subset of the cloud applications, and a floor may communicate with another floor using DCI spine devices. One building may talk to another building via a transit router (TR). Within an AD (i.e., within a building) a CLOS network may be set up and used for enabling communications and data exchanges between servers in that building.

The setting up and management of cloud networks (e.g., CLOS networks) is a difficult, tedious, and time consuming process because the setting up and management tasks are currently done manually. For each network, components of the network generally have to be individually configured and/or provisioned. For example, each leaf device has to be configured including allocating a host name to the leaf device that is recognizable by DNS (Domain Name Server) and DHCP (Dynamic Host Configuration Protocol) (e.g., hostname.oracle.com), specifying VLANs, IP addresses, VRFs (virtual routing and forwarding), interfaces, etc. The information stored and used by the DNS and DHCP servers also has to be updated for each device. As the size and scale of a cloud network increases or changes, network set-up and management becomes a big headache. For example, imagine having to configure and manage a network comprising thousands or even more of devices in a CLOS network. To further complicate matters, the individual devices, for example, the leaf devices can be from different vendors with each vendor having its own unique way of configuring its devices. A network administrator thus has to learn all these different ways of configuring devices for different vendors.

As described herein, techniques are described for automating the network configuration and management of a computing network such as a cloud network through a centralized location as well as the automated provisioning and/or configuration of devices within the computing network. The techniques include enabling the network to be defined using a network model. The model encapsulates information related to the network, such as the network topology (e.g., whether the network is a 2-tier, 3-tier, or n-tier network), network hierarchy, identification of components (e.g., various devices) of the network, characteristics/features and configurations for components of the network, and the like. This model can be ingested and used for the automatic creation and/or configuration of the computing network.

FIG. 1 is a schematic illustration of one embodiment of a network system 100. The network system 100 can comprise one or several computing networks 102. In some embodiments, these computing networks can be arranged into one or several units such as, for example, one or several realms, regions, availability domains, or the like. In some embodiments, an availability domain can comprise one or several computing networks 102. Some or all of the computing networks 102 comprising a network of devices 104. In some embodiments, the network of devices 104 can comprise a 3-tiered Clos network having a spine-and-leaf architecture as depicted in FIG. 1.

The network of devices 104, also referred to herein as the physical network 104 includes transit routers 106-A, 106-B. The network of devices 104 can include any desired number of transit routers 106 including, for example, 1 transit router 106, 2 transit routers 106, 3 transit routers 106, 4 transit routers 106, 5 transit routers 106, 10 transit routers 106, 20 transit routers 106, 50 transit routers 106, 100 transit routers 106, 200 transit routers 106, 500 transit routers 106, between 1 and 20 transit routers 106, between 20 and 100 transit routers 106, between 100 and 500 transit routers, and/or any other or intermediate number of transit routers 106. The transit routers 106 can be connected via first fabric devices 108 to spine devices 110, which spine devices 110 can be connected via second fabric device 112 to leaf devices 114.

In the embodiment depicted in FIG. 1, a set of "n" leaf devices 114 are connected and together form a pod. In some embodiments, this pod further includes a set of "n" second fabric devices 112 connected to the leaf devices. In some embodiments, each leaf device 114 is connected to each second fabric device 112 in a pod, however, there is no connectivity of devices between pods. In certain implementations, two pods are referred to as a block. Each block is served by or connected to a set of "n" spine devices 110, also referred to herein as Tier-2 switches or as spine switches. There can be several blocks in the physical network topology. The spine devices 110 are in turn connected to first fabric devices 108. Communication of packets over physical network 104 is typically performed using one or more Layer-3 communication protocols. Typically, all the layers of the physical network, except for the leaf devices 114 are n-ways redundant thus allowing for high availability. Policies may be specified for pods and blocks to control the visibility of switches to each other in the physical network so as to enable scaling of the physical network.

One or several computing networks 102 are connected with server 116. Server 116 can comprise one or several servers and can administer and/or manage the one or several computing networks 102. The server 116 can, as depicted in FIG. 1, include: Network Automation Server ("NAS")/ Network Deployment Server ("NDS")/Network Management Server ("NMS") 118, also referred to herein as NAS 118, NDS 118, or NMS 118; Dynamic Host Configuration Protocol ("DHCP") server 120; download server 122; storage 124, also referred to herein as topology database 124, which topology database 124 can be an SQL database such as, for example, a SQLite database, and/or a configuration server 130. In some embodiments, server 116 can further include a DNS server. In some embodiments, the DNS server can maintain one or several IP address tables.

The NAS 118 can be a component, embodied in hardware or software, which can be communicatingly coupled to one or several of the computing networks 102. In some embodiments, the NAS 118 can be embodied as one or several computing devices and/or servers that are communicatingly coupled to one or several of the computing networks 102. In embodiments in which the NAS 118 is embodied in software, NAS 118 can be one or several applications. The NAS 118 can administer and/or control one or several aspects of operation and/or configuration of the one or several computing networks 102 and/or of one, some, or all of the devices in the one or several computing networks 102. In some embodiments, NAS 118 can provide network device provisioning, policy enforcement, security lock-down, software management, and compliance reporting. In some embodiments, the NAS 118 can manage and/or deploy independent components and/or devices within the one or several computing networks 102.

The DHCP server 120, which can operate according to DHCP or according to BOOTSTRAP Protocol ("BOOTP"), can be embodied in hardware or software and can be communicatingly coupled to the one or several computing networks 102. In some embodiments, the DHCP server 120 be communicatingly coupled to devices within the one or several computing networks 102. The DHCP server 120 can communicate with the one or several computing networks 102 and/or devices therein according to DHCP to assign Internet Protocol ("IP") addresses. In some embodiments, In some embodiments, the DHCP server 120 can assign a temporary IP address to a requesting, and in some embodiments, the DHCP server 120 can assign a permanent address.

The download server 120 can comprise files for downloading to components and/or devices of the one or several computing networks 102. These can include: one or several configuration files; and one or several pieces of executable code, which can be contained within one or several executable files which can include one or several executable scripts, event files, or the like.

The network system 100 can include storage 124, which storage can be part of server 116 or can be separate from server 116. The storage can comprise memory, and specifically can comprise any desired type or form of memory. In some embodiments, the storage 124 can comprise one or several databases including, for example, a link table, an interface table, a VLAN table, a DNS map, a device table, a locations table, and a VRF table. The storage 124 can further comprise a configuration file database. Some or all of these tables can be populated with information generated, calculated, and/or gathered during operation of the network system 100.

In some embodiments, the locations table (identified as block 1902 in FIG. 17) can include information identifying one or several locations, and one or several devices at those one or several locations. This can include, for example, information relating to one or several devices in a region and/or at a physical location and/or settings for those devices. In some embodiments, these settings can be location specific settings such as, for example, specifying that some or all of devices located at or in a location will include one or several setting, features, or the like.

The device table (identified as block 1904 in FIG. 17) can include information relating to devices within the computing networks 102. This information can include the device name and the device type—the roll of the device within the computing network 102. The device table can further include: device DNS names, identification of peer devices, a list of interfaces for each device, location of the device in the computing network 102, network parameters for the device, the IP addresses for the device, and device settings such as whether the device is enabled, if the device is included in a virtual chassis, and if the device is included in the virtual is chassis, the devices role in the virtual chassis. In some embodiments, data within the device table can be organized as shown below:

| Device Name | Device Type (Tr/Spine/ fabric/Leaf) and Device Id | DNS name | Peer Device | List of Interfaces | Device location | Network parameters (BGP keys) | IP Addresses of Mgmt and gateway | Device settings i)Enabled ii)Vc_role |
|---|---|---|---|---|---|---|---|---|

The interface table (identified as block 1906 in FIG. 17) can include information relating to interfaces contained within the computing network 102. These interfaces can be located on devices in the computing network 102, and these interfaces can be identified, in association with their device, in the list of interfaces in the device table. The interface table can, for some or all of the interfaces identified in the device table, include further information for those interfaces. This information can include, for example, interface name, and interface identifier and/or an associated link identifier, Maximum Transmission Unit ("MTU") for the interface, hostname associated with the interface, IP addresses for the interface, a VLAN list, and a status identifier that can, for example, indicate if the interface is enabled. In some embodiments, data within the interface table can be organized as shown below:

| Interface Name | Interface id and Link Id | Mode Aggregate Virtual VC-Port | MTU IP/Ethernet/ MPLS/Ipv6 | Hostname | IP addresses | Vlan_list | Enabled |
|---|---|---|---|---|---|---|---|

The link table can include information relating to one or several links between devices within one or several of the computing networks 102. This information can include an identifier for a link, properties of the link, devices and/or interfaces coupled by the link, connected hostnames, and whether an indicator of whether the link is enabled. In some embodiments, data within the link table can be organized as shown below:

| Link Name | Link Id | List of Two Interfaces | Link Properties (Speed) | Hostnames connected | Enabled |
|---|---|---|---|---|---|

The VRF table can include information relevant to virtual routing and forwarding. This can include, for example, name of the VRF, a route distinguisher, a list of export route-targets, a list of import route-targets, identification of BGP peers, and Routing Information Protocol (RIP) settings. In some embodiments, data within the VRF table can be organized as shown below.

| Name | Route Distinguisher | RT Export | RT Import | BGP Peers | Interfaces | RIP settings |
|---|---|---|---|---|---|---|

The configuration server 130 can be configured to receive an output comprising information relating to one or several devices within a computing network, and based on that output, generate a configuration file for each of the one or several devices for which information was received. In some embodiments, this output can comprise a topology of a computing network, and specifically can comprises a modelled topology of a computing network that can be created as described below. In some embodiments, this computing network can comprise a Clos network.

This output can be received from a plurality of databases and/or from a plurality of tables. For example, this output can include some or all of the above discussed tables, which tables can be built by, for example, the NAS 118 and/or the topology builder subsystem as discussed below. In some embodiments, this output can comprise a YAML file. Specifically, the output can be generated by, in some embodiments, some or all of the process 500 shown in FIG. 5 and sub-processes thereto. The output can, in some embodiments, be stored in storage 124.

Figure 2:
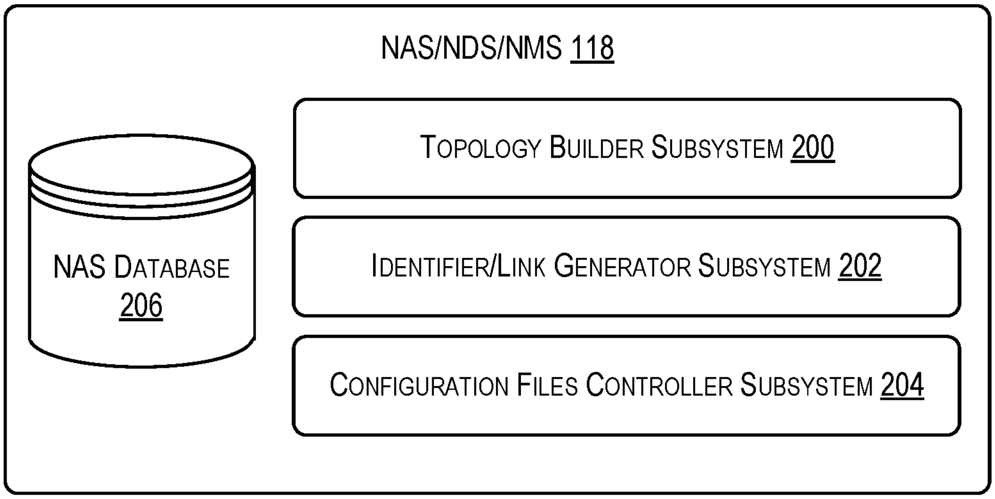
FIG. 2 is a simplified functional diagram of one embodiment of a Network Automation Server/Network Deployment Server/Network Management Server.

FIG. 2 is a functional schematic of one embodiment of NAS 118. As seen in FIG. 2, the NAS 118 can include a topology builder subsystem 200, a link identifier/link generator subsystem 202, a configuration files controller subsystem 204, and a NAS database 206.

The topology builder subsystem 200 can be embodied in hardware or software within the NAS 118. The topology builder subsystem 200 can identify a topology of the computing network 102 and/or generate a topology characterizing a desired computing network 102. This topology can, for example, identify devices within the computing network 102, the location of the devices within the computing network 102, links between the devices within the computing network 102, or the like.

The link identifier/link generator subsystem 202 can be embodied in hardware or software within the NAS 118. The link identifier/link generator subsystem 202 can identify and/or generate one or several links between components and/or devices within the computing network 102. In some embodiments, the link identifier/link generator subsystem 202 can populate all or portions of the storage 124, and specifically, can populate all or portions of the interface table and/or the link table.

The configuration files controller subsystem 204 can be embodied in hardware or software within the NAS 118. The configuration files controller subsystem 204 can identify configuration files relevant to different devices within the computing network 102. This can include maintaining up-to-date firmware files, generating configuration files including, for example, a generic configuration file for one or several devices and/or device types, and/or a specific configuration file applicable to one or several locations within the computing network 102. The configuration files controller subsystem 204 can store identified and/or generated configuration files to the configuration file database in the storage 124.

The NAS database 206 can be a subset of the storage 124 and/or can be distinct from the storage 124. In some embodiments, the NAS database 206 can include one or several databases or tables containing information used or generated by any of subsystems 200, 202, 204.

Automated Network Modeling, Set-up, and Management

In some embodiments, the network system 100, and specifically the server 116 can generate model information, consume the model information, and automate the set-up and management of the network. In some embodiments, this can be performed by the NAS 118. In such embodiments, the NAS 118 can consume the model information, and based upon the model information, the NAS 118 automates the performance of tasks for setting up and managing the network. In certain embodiments, the model information is vendor-agnostic, i.e., does not depend upon a vendor providing a particular network component. The NAS 118 acts as the single administrative system for setting up and managing the network using the model information. In certain embodiments, one NAS 118 is provided for each CLOS network, and in some embodiments, a single NAS 118 can service multiple CLOS networks.

In certain embodiments, the network is modeled using a format or representation that network administrators can easily understand, edit, and update. In certain embodiments, the model is implemented using YAML. As part of specifying the model, the network topology (e.g., 2-tiered, 3-tiered), the various devices that form the network, hierarchical relationships between the devices, configurations for the devices, and the like, can be specified in the network model. The model information may be stored in one or more files. For example, the network model may comprise multiple YAML specification files corresponding to the different network device types (e.g., host, leaf device, fabric device, spine device). The entire network can be modeled (in a vendor-agnostic way) using one or more YAML files. In certain embodiments, a hierarchy is defined in the model. For example, YAML files corresponding to the various device types may be hierarchically related to each other. Accordingly, the network model for a network may specify the network topology, individual components of the network, and characteristics of components (e.g., specify interfaces, which are enabled/disabled, number of leaf devices, number of spine devices, number of fabric devices, etc.). One or more ADs can be modeled.

As an example, in a YAML file for a leaf device type, multiple different model types may be identified corresponding to leaf devices from multiple vendors. For example, a user may input vendor and model in yam file as follows: (1) Vendor and Model definition at global level yam file (fabric definitions) which treat all devices of the given role with given vendor and model; (2) Vendor or Model definition in a host specific yam file will overwrite the global definitions.

In certain embodiments, a group can be specified in the model to bundle the specified devices as single group for automation purpose and parameters defined in the group will be applied on all the devices listed in the group.

Global->Top level YAML (for all devices, settings will be applied)

Group->For group of devices (settings applied from group definitions file and they will overwrite global settings)

Host->For single leaf/spine/fabric/tr/dci (Settings are applied on single device and they will overwrite global and group settings)

Granularity of settings are in the order mentioned above.

Given a model for a network, a centralized NDS 118 is provided that consumes or reads the model information and automatically configures the network based upon the specified model information. Configuring the network may include deriving the specified topology of the network and setting up the network according to the specified topology, and configuring individual devices at multiple layers of the network. The configuring may include setting up links or connectivity between the various devices at the same or different layers of a CLOS network (e.g., links between leaf devices and fabric devices), specifying the interfaces, updating DNS and DHCP servers, and the like. In certain implementations, one NDS 118 is provided per CLOS network. The NDS 118 can have connectivity to all the devices in the CLOS network. In certain implementations, the NDS 118 may host the DNS server and/or DHCP server 120. The network model along with the NDS 118 thus simplify the process of configuring the managing cloud networks.

The modeling and the configuring based on the model can be performed in a vendor agnostic way. As a result, when a new leaf device is to be added to the network, the network administrator may simply update the model to include the new leaf device, connect the device to the existing network and power up the device, and upon power up, the configuration of the device is automatically performed by the NDS 118 based upon the updated model information.

In the examples described in this disclosure, YAML is used for specifying network model information. YAML is a human friendly data serialization format or language. While the network models described herein use YAML, this is not intended to be limiting. Various other modeling languages may be used in alternative embodiments. The network is modeled such that network engineers or administrators of the network can fine tune objects (e.g., components) of (or within) the network through a single administrative system. This disclosure describes an effective way of modelling cloud networks to achieve automation, scale, and seamless management.

In certain embodiments, a network is implemented using a CLoS (or Clos or CLOS) network topology. A cloud provider's cloud infrastructure may include multiple instances of such CLOS networks. For example, a cloud provider may host data centers globally and the data centers may be implemented using one or more CLOS network instances. In certain implementations, one or more data centers may be built per domain (or region). The challenge here is to manage the global CLoS Networks from a single administrator point of view so as to achieve huge scale and minimize human intervention.

In certain embodiments, a CLOS network comprises of an overlay network (lead devices) and an IP Fabric (core of CLOS network). The IP Fabric may comprise of DCI (Data Center Interconnect), TR (transit router), Spine and Fabric devices which may use protocols such as MPLS (Multi-Protocol Label Switching) or L3 (IPv4 or IPv6) for packet switching. The overlay network may comprise leaf devices connecting to the servers. Mostly, the overlay uses MPLS, VXLAN or other well-known tunneling techniques for the applications to communicate. A model is used to represent both the overlay and the IP fabric to manage the topology, links, interfaces, loop back interfaces and manage the IP addresses and tracking and VRFs (virtual routing and forwarding) on the network.

In order to achieve the objectives mentioned above, a model is defined for specifying a hierarchy and instance of the CLOS network. Once a given CLOS network instance is identified, an inventory of subsequent elements like DCI, TR, Spine, Fabric and lead devices is built along with physical network topology.

Figure 3:
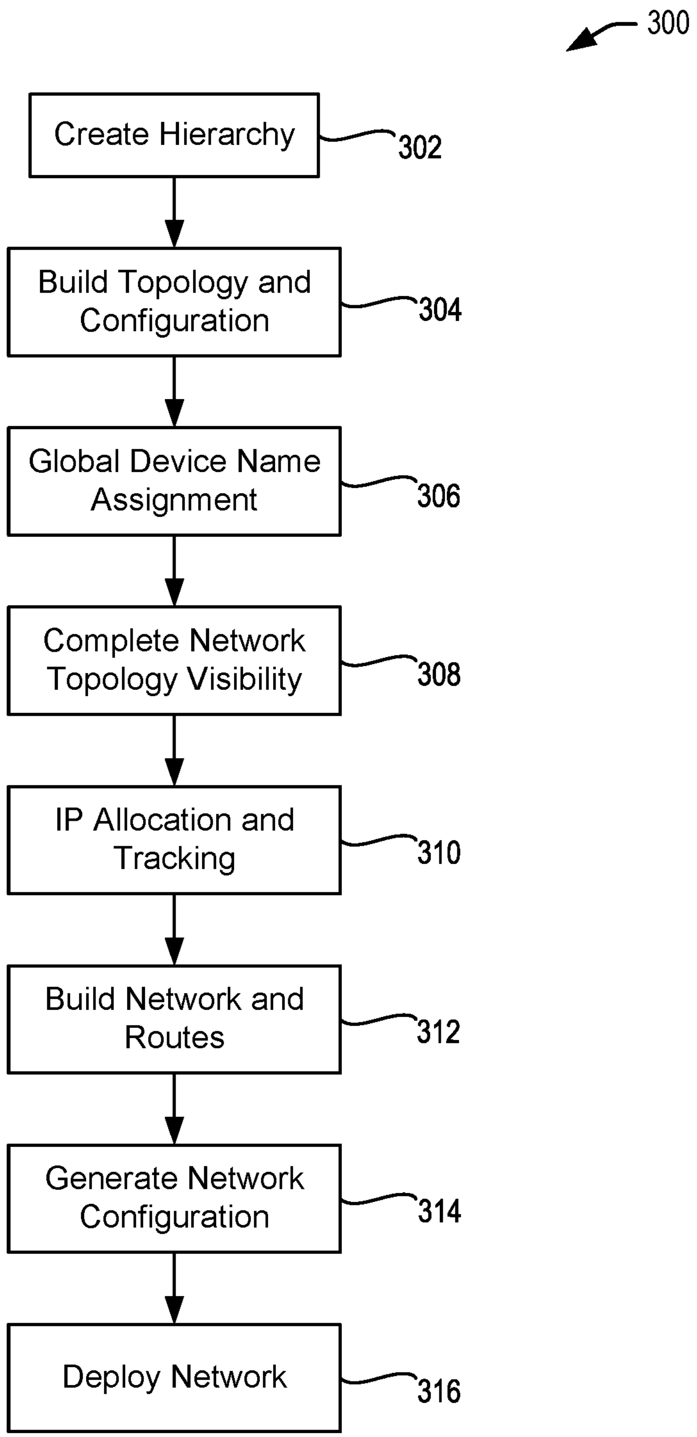
FIG. 3 is a flowchart illustrating one embodiment of a process for automated network modelling, set-up, and management.

In certain embodiments, for a CLOS network instance, the NDS is configured to perform processing as shown in FIG. 3, a flowchart illustrating one embodiment of a process 300 for automated network modelling, set-up, and management.

The process 300 can be performed by network system 100, and/or by server 116 in connection with one or several computing networks 104. In some embodiments, the process 300 can be performed by NDS 118.

The process 300 begins at block 302, wherein a hierarchy for the network is created and/or identified. This hierarchy can identify the relative position of devices within the computing network 102. With this hierarchy, at block 304 a topology and configuration is built. This topology and configuration can be built for underlay and/or overlay levels of the computing network 102 and can include IP fabric and racks. At block 306 global device names are assigned to devices in the computing network 102. At block 308, network topology visibility is completed. This can include the creation of a physical cable map, graphs, links, and individual interfaces. At block 310 IP addresses are allocated and tracked for the devices in the computing network 102. At block 312 the computing network 102 and communication routes within the computing network 102 are built. At block 314, the configuration is generated for the computing network 102, and at block 316, the computing network 102 is deployed.

The following sections below provide further details, including description of algorithms being used, for each of the process steps identified above to manage the cloud networks.

Hierarchy Creation

In this step of the processing, a hierarchy is created to define a CLOS network instance. In some embodiments, the creation of the hierarchy can include the iterative determining of the position of a device within the computing network 102 until the position of a desired some or all of the devices in the computing network 102 have been determined. In some embodiments, determining the hierarchy of the computing network 102 can include determining tiers within the computing network 102, and determining the tier to each devices in the computing network 102 belongs.

Figure 4:
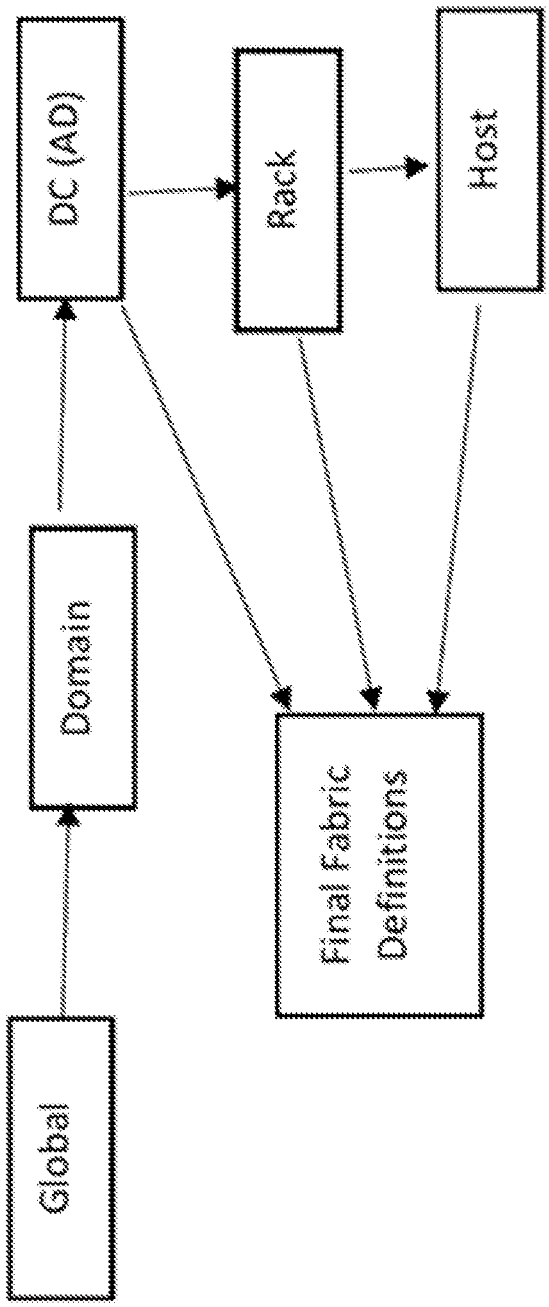
FIG. 4 is a depiction of one embodiment of an exemplary hierarchy.

The setting of the networks in the hierarchy are defined. If defined, a child level setting overrides the parent object settings in the hierarchy, otherwise the parent object settings would be propagated to all child objects. FIG. 4 is a depiction of one embodiment of an exemplary hierarchy 400.

Apparatus for Topology Building

In this step of the processing, the entire fabric topology is modelled, for example, in a fabric definitions file using a language such as YAML, where the fabric definition specifies where the topology, number of spine, fabric and leaf devices along with their models are specified. The fabric definitions file may also include active and inactive devices lists and also specify how to calculate the network topology.

A sample fabric definition file is shown below:

Fabric Definitions

```
---
unit:
  snmp_location: "US Salt Lake City UCF dc1 c1u1"
  # denotes cage and unit
  name: c1u1
  # First 10 addresses are reserved
  ipv4_mgmt_net: 10.69.132.0/22
  ipv4_mgmt_gateway: 10.69.132.1
  fabric type: ThreeTier
  # Split up over the various tiers. This is just handy
  # loopback pool
  loopbacks: 172.16.84.0/22
  # point to point link pool
  links: 172.22.64.0/18
```

-continued

```
    # Currently only BGP (assumption is multi-protocol & BGP-LU)
    routing: bgp
    tr_asn: 65000
    spine_asn: 64949
    fabric_asn: 64948
    leaf_asn: 65000
    flow_collectors:
    - ip: 10.69.135.224
      port: 6343
      flow_type: sflow
    - ip: 10.69.135.225
      port: 2055
      flow_type: netflow
  # Transit router definition
  tr:
    vendor: juniper
    enabled: all
    active: all
    model: mx960
    fabric_100g: True
    uplinks:
      - id: 0
        name: et-0/0/2
      - id: 1
        name: et-0/1/2
      - id: 2
        name: et-1/0/2
      - id: 3
        name: et-1/1/2
    interfaces:
      - id: 0
        name: et-0/0/2
      - id: 1
        name: et-0/1/2
      - id: 2
        name: et-1/0/2
      - id: 3
        name: et-1/1/2
  # Spine device definition
  spine:
    enabled: 1,10
    active: 1,10
    vendor: juniper
    model: qfx10002-72q
  #Fabric device definition
  fabric:
    # 'enabled' allows us to deploy only a select list of fabrics.
    enabled: 1-2, 5-6, 9-10
    active: 1-2, 5-6, 9-10
    vendor: juniper
    model: qfx10002-72q
    fabric_100g: True
    # Divides each linecard into groups
    interface_groups: 4
  #Leaf device definition
  leaf:
    # 'enabled' allows us to deploy only a select list of leaves.
    enabled: 1-6, 31-42
    active: 1-6, 31-42
    vendor: juniper
    model: qfx5100-48-6q
    redundant: True
    # Are TOR Virtual Chassis - True/False
```

Rack Definitions

This file contains VLAN and VRF definitions for leaf devices. Sample file contents are shown below.

```
---
###### External Compute - Guest
racks:
### 1 rack number
- name: r513
  switches:
##### 2 leaves per TOR
  - dc1-c1u1-leaf-1
  - dc1-c1u1-leaf-2
```

-continued

```
  vrfs:
##############################################################
### Nimbula guest rack
   - name: isp-vr
     rd: 65000:001001001
     rt_import:
     - 65000:001001001
     # Security VRF
     - 65000:115050101
     # Legacy ISP-VR
     - 65001:001001001
     rt_export:
     - 65000:001001001
     # Legacy ISP-VR
     - 65001:001001001
     vlans:
     - vlan_id: 10
       name: us11-ispvr-v10
       l3info:
         ipv4:
           addr:
########### Dom0 subnet
           - 10.69.156.1/26
########### Instance subnet
           - 10.106.0.1/19
#          dhcp_relay:
########### Admin rack dhcp relay
       ports:
       - name: xe-0/0/0-35
       - name: xe-1/0/0-35
       rip_enabled: True
       rip_networks:
       - 100.73.0.0/18
       - 139.185.192.0/18
##############################################################
# Port Descriptions
# RackLayouts: Compute X6-2 LS
  ports:
   - name: xe-0/0/0
     description: "compute-u2"
   - name: xe-0/0/1
     description: "compute-u3"
   - name: xe-0/0/2
     description: "compute-u4"
   - name: xe-0/0/3
     description: "compute-u5"
```

Host File (Example Shown Below)

This file contains model information specifying the characteristics for a network component that is a host device.

```
---
interfaces:
- description: dc1-c1u1-dci-1
  ipv4_addr:
  - 192.168.37.1/31
  mode: l3
  mpls_enabled: true
  name: ae0
  parent: None
  subint: 0
  type: 'aggregate'
  bfd_neighbor: 192.168.37.0
- description: dc1-c1u1-dci-2
  ipv4_addr:
  - 192.168.37.5/31
  mode: l3
  mpls_enabled: true
  name: ae1
  parent: None
  subint: 0
  type: 'aggregate'
  bfd_neighbor: 192.168.37.4
- description: dc1-c1u1-dci-1 - Hu0/0/0/0
  mode: aggregate
  mpls_enabled: true
```

-continued

```
  name: et-0/0/5
  parent: ae0
  subint: 0
  type: 'physical'
- description: dc1-c1u1-dci-2 - Hu0/0/0/0
  mode: aggregate
  mpls_enabled: true
  name: et-0/1/5
  parent: ae1
  subint: 0
  type: 'physical'
ss_bgp:
- address: 192.168.37.0
  as_number: 64947
  enabled: true
  name: dc1-c1u1-dci-1
  type: ss
- address: 192.168.37.4
  as_number: 64947
  enabled: true
  name: dc1-c1u1-dci-2
  type: ss
edge_bgp:
- address: 192.168.36.8
  as_number: 65000
  enabled: true
  name: dc1-c1u1-ilr-1
  type: edge
- address: 192.168.36.9
  as_number: 65000
  enabled: true
  name: dc1-c1u1-ilr-2
  type: edge
```

Builder Process (Example)

Figure 5:
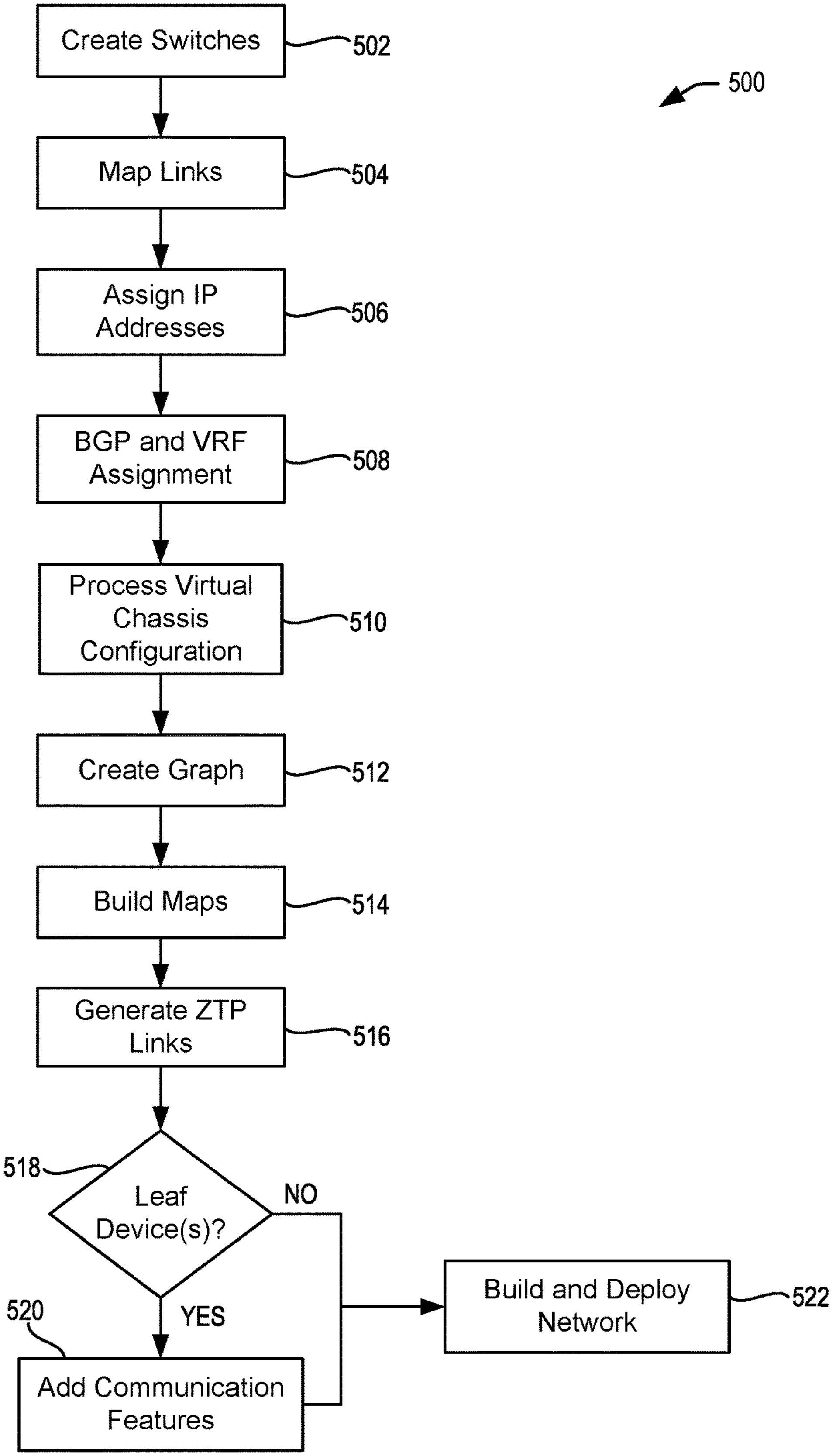
FIG. 5 is a flowchart illustrating one embodiment of a process for automating network setup based upon model information.

FIG. 5 is a flowchart illustrating one embodiment of a process 500 for automating network setup based upon model information according to certain embodiments. The process 500 can be performed by network system 100, and/or by server 116 in connection with one or several computing networks 104. In some embodiments, the process 500 can be performed by NDS 118. The NDS 118 reads the model information for a network and then performs the tasks shown below in process 500.

The processing depicted in FIG. 5 may be implemented in software (e.g., code, instructions, program) executed by one or more processing units (e.g., processors, cores) of the respective systems, using hardware, or combinations thereof. The software may be stored on a non-transitory storage medium (e.g., on a memory device). The method presented in FIG. 5 and described below is intended to be illustrative and non-limiting. Although FIG. 5 depicts the various processing steps occurring in a particular sequence or order, this is not intended to be limiting. In certain alternative embodiments, the processing may be performed in some different order or some steps may also be performed in parallel.

The process 500 begins at block 502, wherein switches are created. In some embodiments, the switches can be created at each layer and/or tier in the computing network 102. The creation of switches can, in some embodiments, include the counting of switches and the creation of a switch list. In some embodiments, creating switches at each layer in the computing network can include: determining a hierarchy of devices in the computing network, which hierarchy defines a plurality of tiers of the computing network and identifying devices within each tier of the computing network; computing a number of switches in each tier of the computing network; and adding a representation, such as a DNS name, of each of at least some of the identified devices to a device database. In some embodiments, adding a representation of each of the at least some of the identified devices to the device database can include: adding switch attributes; and adding a physical interface list.

At block 504, links are mapped. In some embodiments, each link connects to a device in the computing network 102, and specifically each link connects a pair of devices in the computing network 102. In some embodiments, the mapping of links can include the identification of links between devices in the computing network 102.

At block 506 IP addresses are assigned and/or allocated. In some embodiments, each device in the computing network 102 is allocated an IP address. A block 508 Border Gateway Protocol ("BGP") and Virtual Routing and Forwarding ("VRF") are assigned. In some embodiments, this can include the creation of BGP routing for one or both of an underlay network and an overlay network. A block 510 any virtual chassis configuration is processed.

At block 512 a graph is created, and specifically a topology graph of the computing network 102 is created. In some embodiments, this topology graph comprises a plurality of nodes, each of which nodes represents one of the devices in the computing network 102. In some embodiments, the nodes are pairwise connected by edges, each of which edges represents a link. In some embodiments, this topology graph reflects the hierarchy of the computing network 102.

At block 514 maps are built. These maps can include, in some embodiments, a DNS map and/or a cable map. At block 516, Zero Touch Provisioning ("ZTP") links are generated. In some embodiments, this can include configuring each device in the computing network, which can include identifying a configuration file for each of the devices in the computing network, and loading its configuration file onto each device in the computing network. In some embodiments, this can include configuring each device in the computing network, which can include identifying a configuration file for each of the devices in the computing network, and loading its configuration file onto each device in the computing network. In some embodiments, this can include, for each device in the computing network, receiving a configuration file corresponding to a unique name for the device. In some embodiments, this unique name can be generated at least in part based on directly linked devices. In some embodiments, directly linked devices can be identified according to communications exchanged via Link Layer Discovery Protocol ("LLDP").

At decision step 518 the presence of leaf devices in the computing network 102 is determined and leaf devices are identified. If there are leaf devices, and for the leaf devices, the process 500 proceeds to block 520, wherein communication features are added and/or coupled to those leaf devices. In some embodiments, these communications features can include at least one of: a virtual local area network ("VLAN"), VRF; a VLAN interface; and a VLAN port. After the communication features have been added to leaf devices at block 520, and for devices other than leaf devices after decision step 518, the process 500 proceeds to block 522, wherein the network is built and deployed.

Create Switches

Figure 6:
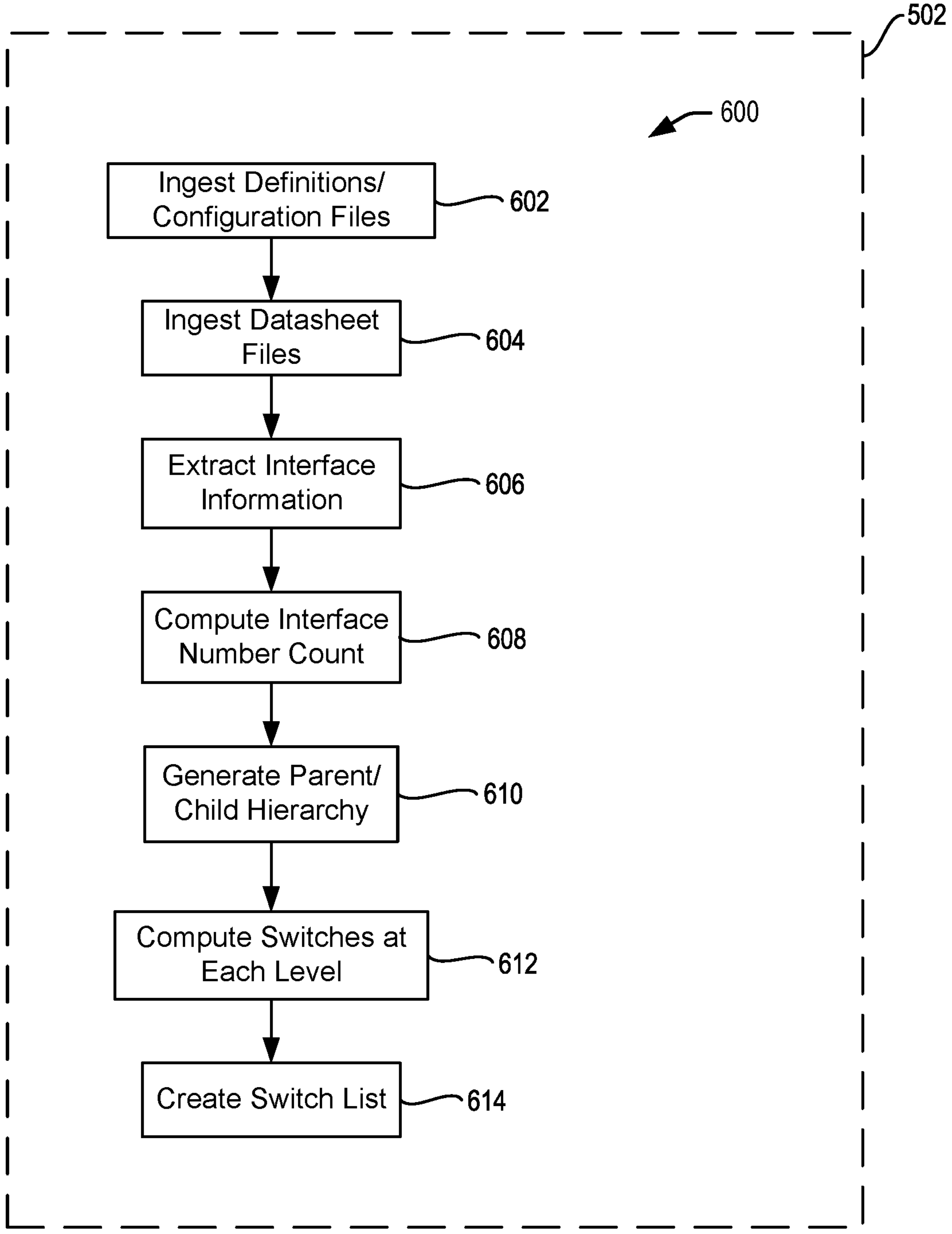
FIG. 6 is a flowchart illustrating one embodiment of a process for creating switches.

With reference now to FIG. 6, a flowchart illustrating one embodiment of a process 600 for creating switches is shown. The process 600 can be performed as a part of, or in the place of step 502 of FIG. 5. The process 600 begins at block 602, wherein definitions and configuration files are ingested. This can include ingesting the fabric definitions, the default fabric definitions, global, domain, data center, AD, rack, and/or host variable files.

At block 604, datasheet files are ingested. In some embodiments, this can include reading model datasheets from device library files, these model datasheets corresponding to devices in the computing network 102. From the datasheets, interface lists can be extracted as indicated in block 606, and, based on the interface list, an interface number count can be computed and interface identifiers can be determined as indicated in block 608.

At block 610, a parent/child hierarchy is generated. At block 612, the number of switches at each level is computed. At block 614, a switch list is created. One exemplary embodiment employing the process of FIG. 6 is shown below.

Hierarchy

If the computing network 102 has a 2-tier topology, then the hierarchy can be as follows:

Tr->Fabric->Spine->Fabric->Leaf

If the computing network 102 has a 2-tier topology, then the hierarchy can be as follows:

Tr->Fabric->spine->leaf

Compute Number of Switches at Each Level

If the topology is 3-tier (as 2-tier topology is a subset of 3-tier, 2-tier topology is not specifically addressed):

i) Transit Routers (From fabric-definitions file), n_tr (2 by default)

ii) Spine switches (n_spines): Number of fabric ports)/2 ii) pod_count=(number of spine ports/number of leaf Ports)

Pods are the smallest deployable units of computing iv) Fabric switches (n_fabrics): Number of leaf ports*pod_count v) If (transit routers are deployed)

Leaf switches (n_leafs): (Number of Fabric_ports/2)*(pods_count−1)

Else

Leaf switches (n_leafs): (Number of Fabric_ports/2)*(pods_count)

Create Switch List

After each layer switch counts are computed, create switches at each layer (tr, spine, fabric and leaf) as follows.

i) Read enabled switch list, active switch list and inactive switch list from Fabric-definitions. If a switch is part of inactive list, skip the switch from topology building of steps 5 below.

ii) Generate the switch host name (<DC>.<unit>.<switch_type>_<switch_number> iii) Generate DNS domain name<hostname>.<AD>.oraclecloud.com

Example

All host names are in lowercase.

The format of hostnames for all devices can be as follows:

<domain)-(dc>)-(uxxx))-<role>##(a/b)(-###(d))

Domain is the geographic complex identifier—3 digits max and should match the first 3 letters of the Building Code (dc)—data center identifier (uxxx)—Optional component for unit number where xxx is the unit number and letter "u" is a constant. This is only used in leaf and spine deployments and denotes the unit the device belongs too.

role—can be up to a 5 character acronym for the device role (this can be of variable length).

(a/b) is for devices providing a master backup device in which only 1 can forward traffic at any given time (e.g., firewalls and load balancers)

(-###(d)) is for indicating the number within a stack of stackable switches (think 3750 stacks), starting with a 1 dc1-c1u1-dci–1.usdc11.oraclecloud.com dc1-c1u1-ilr-2.usdc11.oraclecloud.com dc1-c1u1-tr–1.usdc11.oraclecloud.com dc1-c1u1-tr-2.usdc11.oraclecloud.com iv) Add attributes to the Switch (vendor, model, hostname, dnsname, type v) Add switch to the device database.

vi) Assign an index to the switch equal to its location in the tier.

vi) For each switch, create interface groups attribute to the value specified in fabric definition.

vii) Read the physical interface list from device library and create a physical interface list for the device.

viii) Add the "id" specified in the interface file in the device library to the interface entry.

ix) Add the interface list to device in device DB.

x) Add interface list to interface DB and Map each interface to the parent switch. Maintain the container mapping for each interface, i.e. to which host (device) the interface belongs to.

Map Links

Figure 7:
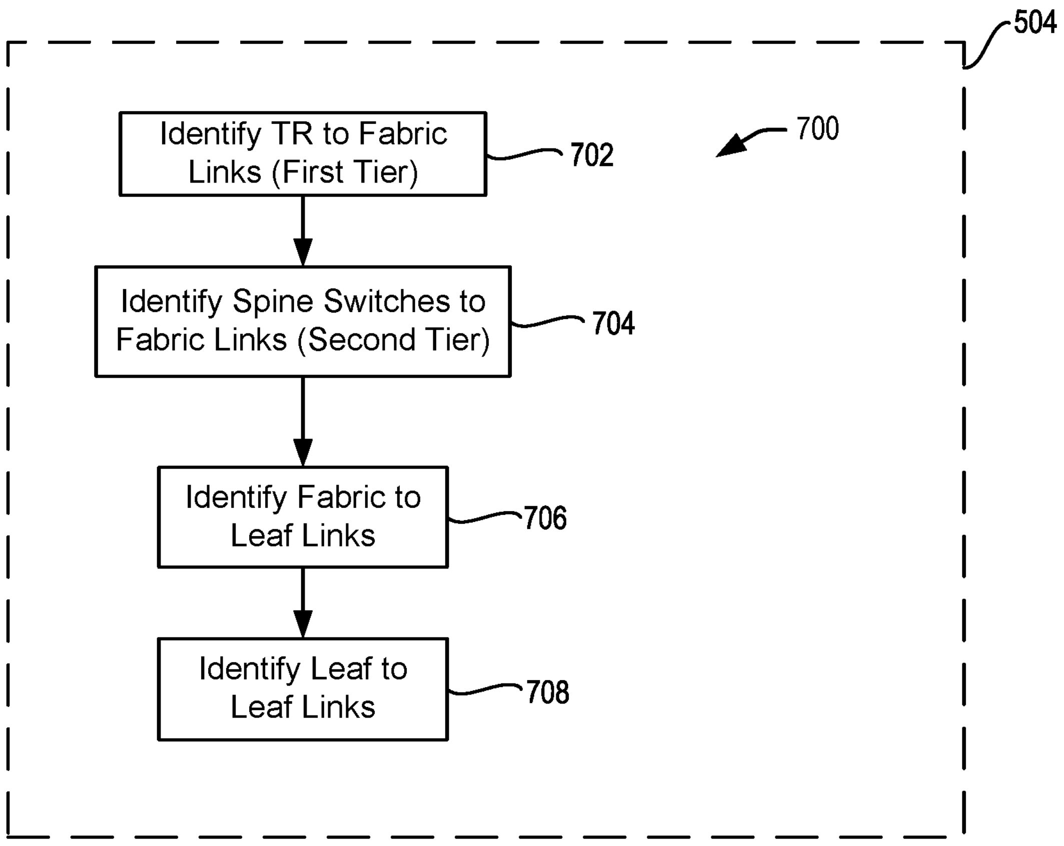
FIG. 7 is a flowchart illustrating one embodiment of a process for mapping links.

With reference now to FIG. 7, a flowchart illustrating one embodiment of a process 700 for mapping links is shown. The process 700 can be performed as a part of, or in the place of step 504 of FIG. 5. The process 700 begins at block 702, wherein Transit Router ("TR") to fabric links are identified and/or created. At block 704, links from spine switches to fabric switches are identified and/or created. At block 706, links from the fabric to leaf are identified and/or created. At block 708, links from leaf to leaf are identified and/or created. In some embodiments, identification of links from leaf to leaf can further include identifying peer links between leaf devices. In some embodiments, each of these links can be assigned a link identifier, and the link identifier can be stored in the link table. In some embodiments, this can be performed as outlined below:

Leaf switches (n_leafs): (Number of Fabric_ports/2)*(pods_count)

Transit Router to Fabric Switches (First Tier)

i) Get the number of transit routers=n_tr ii) Read the fabric-definitions file and read the uplinks from transit router to fabric switch, this can be called n_tr_uplinks iii) Number of fabric switches to be used n_fabrics=n_tr_uplinks)

iv) Take the fabric switched from 0 . . . n_fabrics v) Generate a link from each fabric switch to each tr router as follows:

Take current fabric switch index, fabric_id

Take the fabric interface from 0 to (n_tr–1)

Connect these to each tr switch in n_tr list, interfaces in the uplink list indexed by fabric_id Assign a link id to the links generated Add the two interfaces as link vertices Validate link specific settings on this link. Assign same settings to both the interfaces on the interfaces.

Spine Switches to Fabric Switches (Second Tier)

i) Connect the even interface on the fabric switches to each interface on spine switches.

ii)

a) For each spine switch, obtain the spine_switch_index b) Then for each fabric switch, obtain the fabric_switch_index Get the interface on the spine switch interface list using fabric_switch_index Get the interface from even interface list on the fabric using spine_switch_index Example if spine switch index is 3 and fabric switch index is 5 spine3[5] will be connected to fabric5[6]

In general: spine3[0]<->fabric0[6]

spine3[1]<->fabric1 [6]

spine3[2])->fabric2[6]

fabric0[0]<->spine0[0]

fabric0[2]<->spine1[0]

fabric0[4]<->spine2[0]

Using the algorithm, create a link between spine and fabric interfaces

Generate a unique link id called link_id. Use ID generation module which keeps track of used and used link ids.

Assign link_id to fabric_interface

Assign link_id to spine_interface

Validate link specific settings on this link. Assign same settings to both the interfaces on the interfaces.

Fabric to Leaf i) From the configuration, read the uplinks desired from leaf to fabric=n_leaf_uplinks ii) Derive fabric_offset=(if transit router deployed)?(n_fabrics–1): 0 iii) leaf_counter=0 iv) For each leaf_no in n_leafs:

For each uplink_no in n_leaf_uplinks: { fabric_id=(uplink_no*leaf_no)+fabric_offset

On the fabric device with given fabric_id, get the interface from odd interface list on the fabric using index leaf_counter Get the leaf interface from uplink and id Create link (leaf interface, fabric_interface)

Increment leaf_counter

Leaf to Leaf i) Read configuration and check if the leafs deployments, i.e. virtual-chassis, redundancy or standalone ii) For each leaf is leaf switch list:

If leaf is virtual chassis:

a) Set up the even leaf leaf1 (leaf_no) as virtual chassis master.

b) setup immediate odd leaf leaf2 (leaf_nov+1) as virtual chassis backup.

c) Mark both leafs as peers.

d) Read the peer_link interface list from the fabric-definitions file.

e) create a link between peer interfaces and assign the link id.

f) Mark the interfaces as vc-port https://www.juniper.net/documentation/en_US/junos/topics/reference/commandsummary/request-virtual-chassis-vc-port-uplink.html g) The traffic on the vc-ports are dedicated for vccp (virtual chassis control plane), i.e to interconnect the members of Virtual chassis.

Otherwise, if the leaf has redundancy enabled a) Starting with leaf_index 0 and 1, create an aggregate leaf of 2 members. Repeat this for Subsequent leafs in the list b) Both members are primary.

c) Read the peer_link interface list from the fabric-definitions file.

d) create a link between peer interfaces and assign the link id.

e) Mark the link as "aggregate" which sets the interface mode to "aggregate"

f) Create a parent aggregate interface ae0. Add the interfaces mentioned in the peer_links Under aggregate parent ae0 on both leafs.

g) On the parent interface ae0 on both leaves set the interface mode to trunk configure the vlan list as all configure native_vlan (vale id 999) so that traffic between the members Is accepted without a vlan tag h) On both the leafs:

Configure IRB interface on native vlan (vlan id 999) https://www.juniper.net/documentation/en_US/junos/topics/topic-map/irb-andbridging. html set the interface type to virtual set the interface mode to 13

Figure 8:
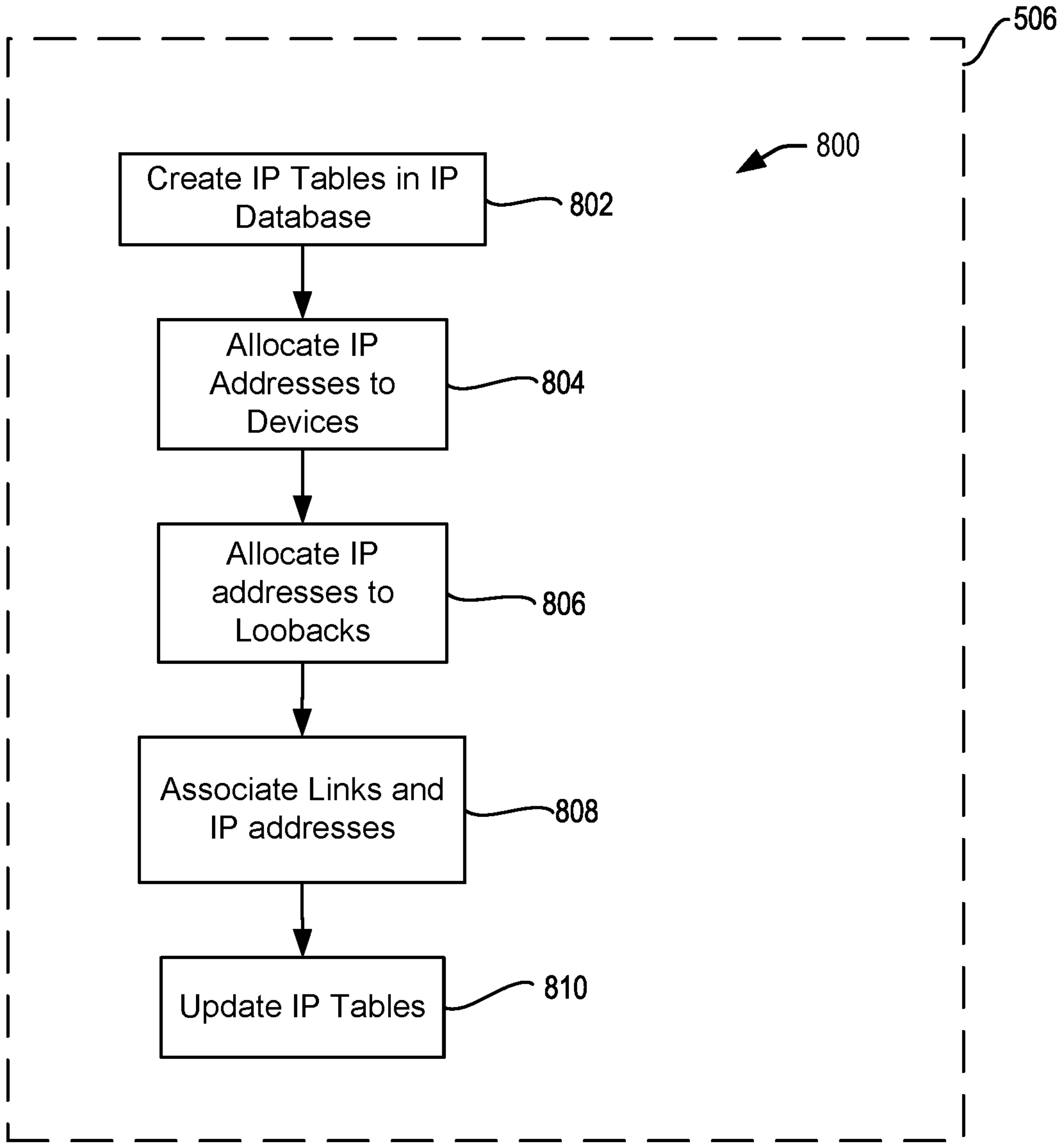
FIG. 8 is a flowchart illustrating one embodiment of a process for assigning IP addresses.
Figure 9:
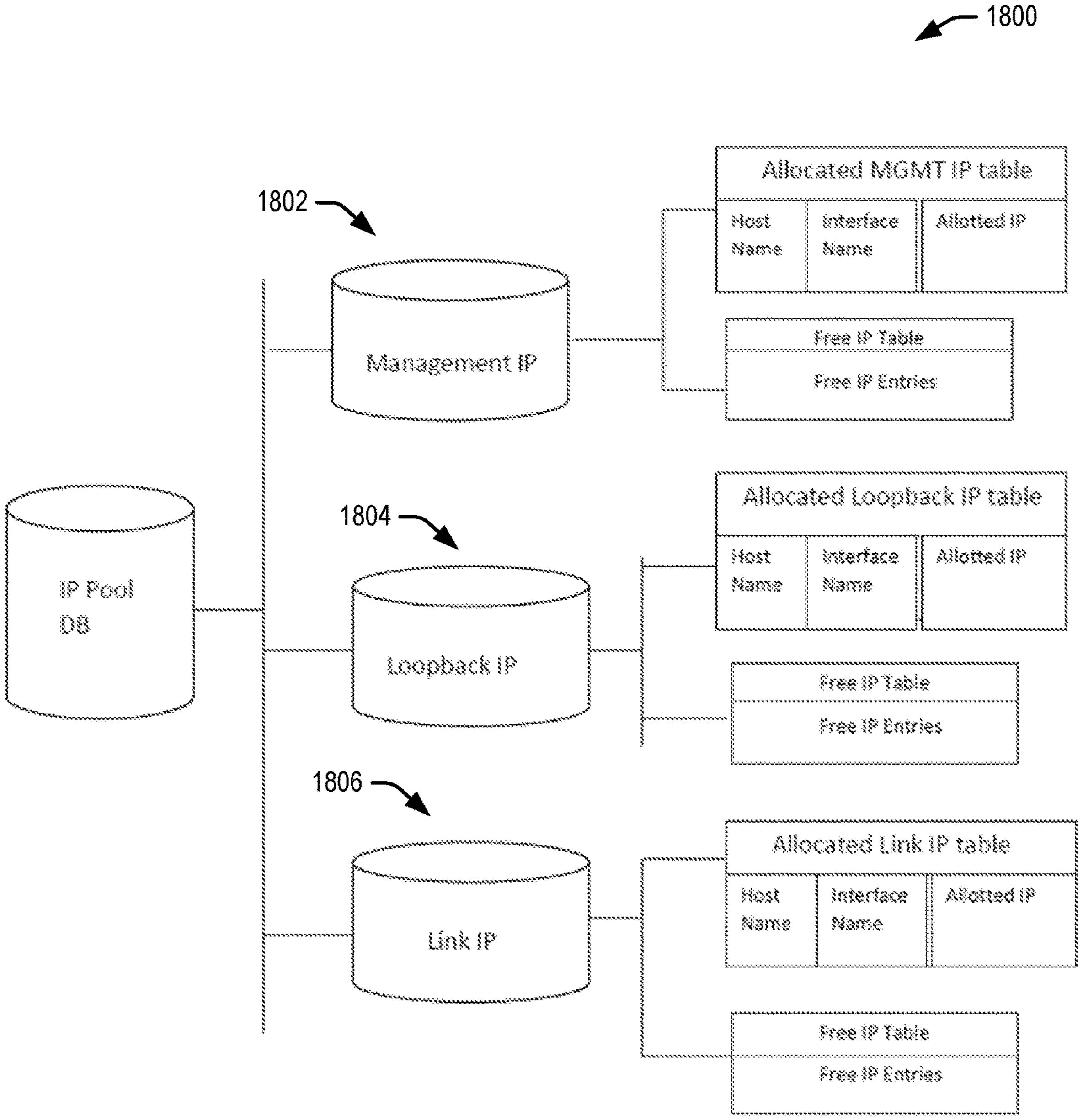
FIG. 9 is a schematic illustration of one embodiment of a database structure for IP address information.

It will allow traffic to be routed among vlans i) Create a link between IRB interface created on both the leafs Assign IP Addresses With reference now to FIG. 8, a flowchart illustrating one embodiment of a process 800 for assigning IP addresses is shown. The process 800 can be performed as a part of, or in the place of step 506 of FIG. 5. The process 800 begins at block 802, wherein IP tables in the IP database are created. In some embodiments, these tables can be created as depicted in the database structure 1800 shown in FIG. 9. As shown, this database structure 1800 can include a management IP table 1802 containing management IP address information, a loopback IP table 1804 containing loopback IP address information, and a link IP table 1806 containing link IP address information. At block 804, IP addresses are allocated to devices in the network of devices 104. At block 806, IP addresses are allocated to loopbacks. At block 808, IP addresses are allocated to links, and at block 810, IP tables, such as the IP tables 1802, 1804, 1806 in the database structure 1800 can be updated. In some embodiments, updating these tables can include, storing IP addresses allocated to devices in the management IP table 1802, storing IP addresses allocated to loopbacks in the loopback IP table 1804, and storing IP addresses allocated to links in link IP table 1806. In some embodiments, this can be performed as outlined below:

The IP pool can be specified for links and Loopbacks from the private network range (172.16.0.0/12

Private-Use Networks [RFC1918]).

Functional Specifications

Loopbacks will take as the next available/23 range from 172.16.0.0/23->172.16.238.0/23 (120 L&S Max)

Links should be taken as the next available/19 range from 172.17.0.0/19->172.31.224.0/19 (15*8=120 L&S Max)

IP address tracker will keep track of IP assigned from the pool described above and assign the IPs based on interface type.

Each link would be assigned a/31. Note that we are planning to do away this requirement in the future by asking our vendors to support "IP unnumbered" for the network links. In addition to that we need about 22k loopback addresses—each a/32.

Generate the list of DNS names/IP mapping for adding the new devices/interfaces into the cloud DNS server IP Allocation Algorithm We assign each of the IP pools to IP DB. The IP DB further expands to two tables, one is assigned IP table and other one is free IP address tables.

Initialize all the entries in allocated IP Pool to the free IP table entries.

Management IP Address Allocation i) For each device, invoke the vendor plugin to return the management interface name.

ii) Assign free_mgmt_ip database table to management network pool ii) Assign one IP from free_mgmt_ip to the device management ip.

iii) Add the IP to the "in_use" management network ip database table.

iv) Remove the IP from free_mgmt_ip database table

Loopback IP Allocation i) For each device, invoke the vendor plugin to return the loopback interface name.

ii) Assign free_lo_ip database table to loopback ip pool entries ii) Assign one IP from free_lo_ip to the device loopback interface.

iii) Add the assigned IP to the "in_use" looback ip database table.

iv) Remove the IP from free_loopback_ip database table

Link IP Address Allocation i) For each link, obtain both interface names that are part of the link.

ii) Assign free_link_ip database table to link ip pool entries iii) If any of the interfaces in the link do not have "aggregate" or "vc-port" as the mode:

a) Assign Two IPs from free_link_ip database to each of interface that are part of the link b) Add the two IPs from the "in_use" link ip database table.

c) Remove the IP from free_link_ip database table d) Enable "mpls" or "tunneling" on the link interface.

VRF and BGP Assignment

Figure 10:
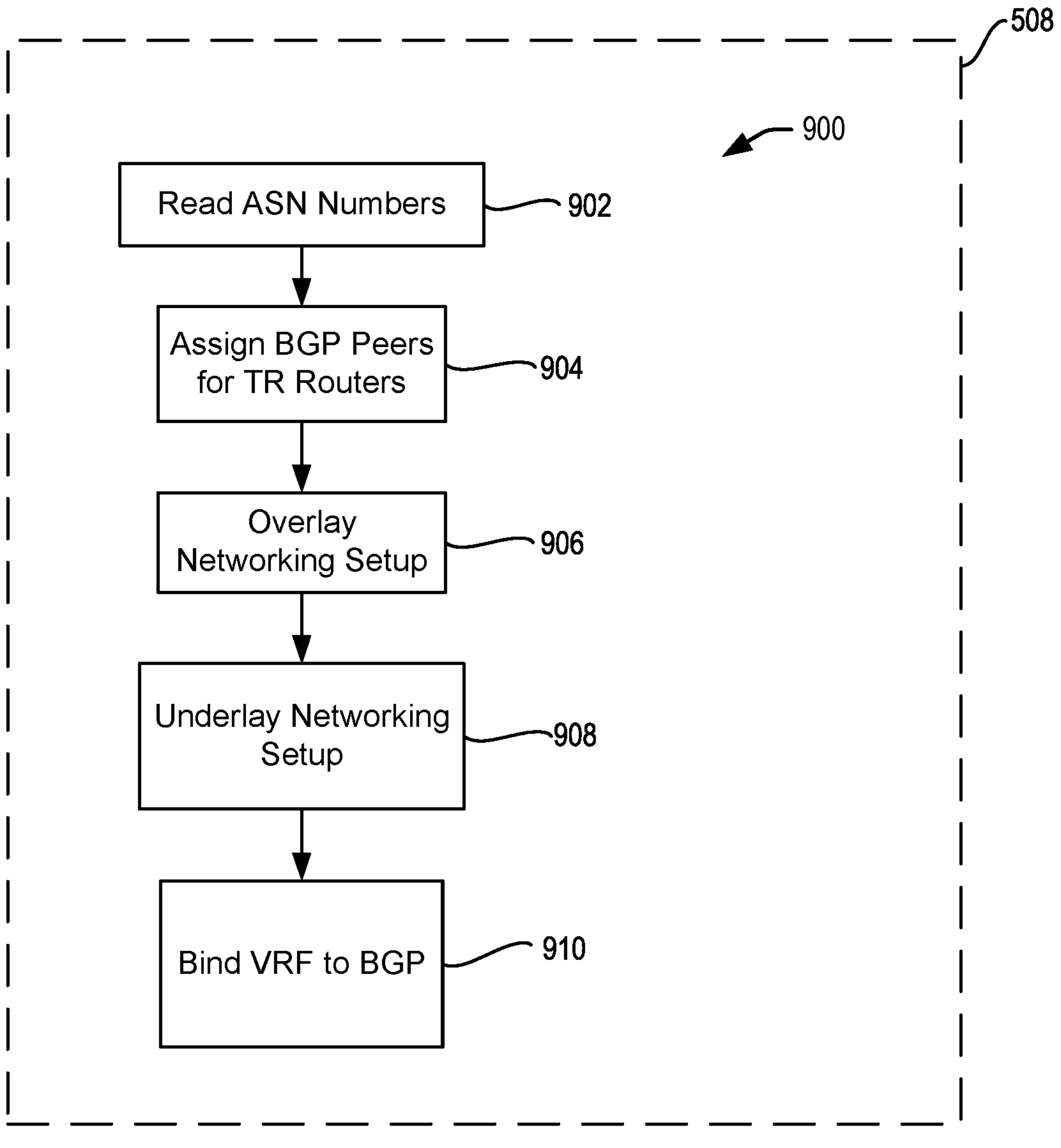
FIG. 10 is a flowchart illustrating one embodiment of a process for VRF and BGP assignment.

With reference now to FIG. 10, a flowchart illustrating one embodiment of a process 900 for VRF and BGP assignment is shown. The process 900 can be performed as a part of, or in the place of step 508 of FIG. 5. The process 900 begins at block 902, wherein Autonomous System Numbers ("ASN") are assigned. In some embodiments, the ASN can facilitate in the control of routing within the computing network 102. At block 904 BGP peers are identified and/or assigned for the TR routers. At block 906, the overlay network is setup, and at block 908, the underlay network is setup. At block 910, VRF and BGP are bound. In some embodiments, this can be performed as outlined below:

Functionality

A route distinguisher (RD) is an address qualifier used only within a single ISP's MPLS network to distinguish the distinct VPN routes of separate customers who connect to the provider.

Has only one purpose: to make IPv4 prefixes globally unique.

Example RD Prefix

America: DC1 (011), . . . , DCx (112)

EMEA: DC1 (202), . . . , DCx (204)

APAC: DC1 (301), . . . , DCx (303)

The example RD usage is illustrated in the "Rack File" section.

BGP Routing Setup (Underlay and Overlay)

1. Read the ASN number for tr, fabric, spine and leaf from fabric-definitions.
2. For tr routers,
   - i) For each other tr router in tr_list
   - ii) Take loopback ip addresses of the remote tr routers assigned in previous step.
   - iii) Assign that loopback ip as a bgppeer of current tr router
   - iv) Store the BGP peers in database
3. Overlay networking setup The overlay consists of "leaf, fabric, spine and tr" towards fabric facing (non-server and nonsuper-spine) interfaces.

I) For each device:
   - A) For interfaces which part of valid links (super spine and serve facing interfaces doesn't have links)
   - B) Obtain the peer interface on the link, and peer hostname
   - C) Obtain the IP address of peer interface
   - D) Configure the IP and hostname as BGP peer of current device
   - E) Store the BGP peer in the database.
4. Underlay networking setup Underlay consists of tr routers and leaf routers.
   - i) Get the tr_list.
   - ii) For each tr in tr_list:
     - A) Obtain the loopback ip of the tr
     - B) Store the loopback ip and tr device name in tr_bgp peer_list
   - iii) Get the leaf_list
   - iv) or each leaf in leaf_list:
     - A) Obtain the loopback ip of the leaf
     - B) Store the loopback ip and leaf device name in leaf_bgp peer_list
   - v) On each tr, configure all the entries in leaf_bgp_ peer_list as bgp_peers.
   - vi) On each leaf, configure all the entries in tr_bgp_peer_list as bgp_peers.
5. Read the vhf name and settings from the configuration file.
   - i) Assign all fabric participating interfaces to vrfs
   - ii) Assign the Route Distinguished, rt import and rt export to the VRF.
   - iii) Bind the VRF to BGP so that BGP can advertise the routes to BGP peers.

The BGP Peers built on each device will get network routing info learnt by the switch.

Create Graph

Figure 11:
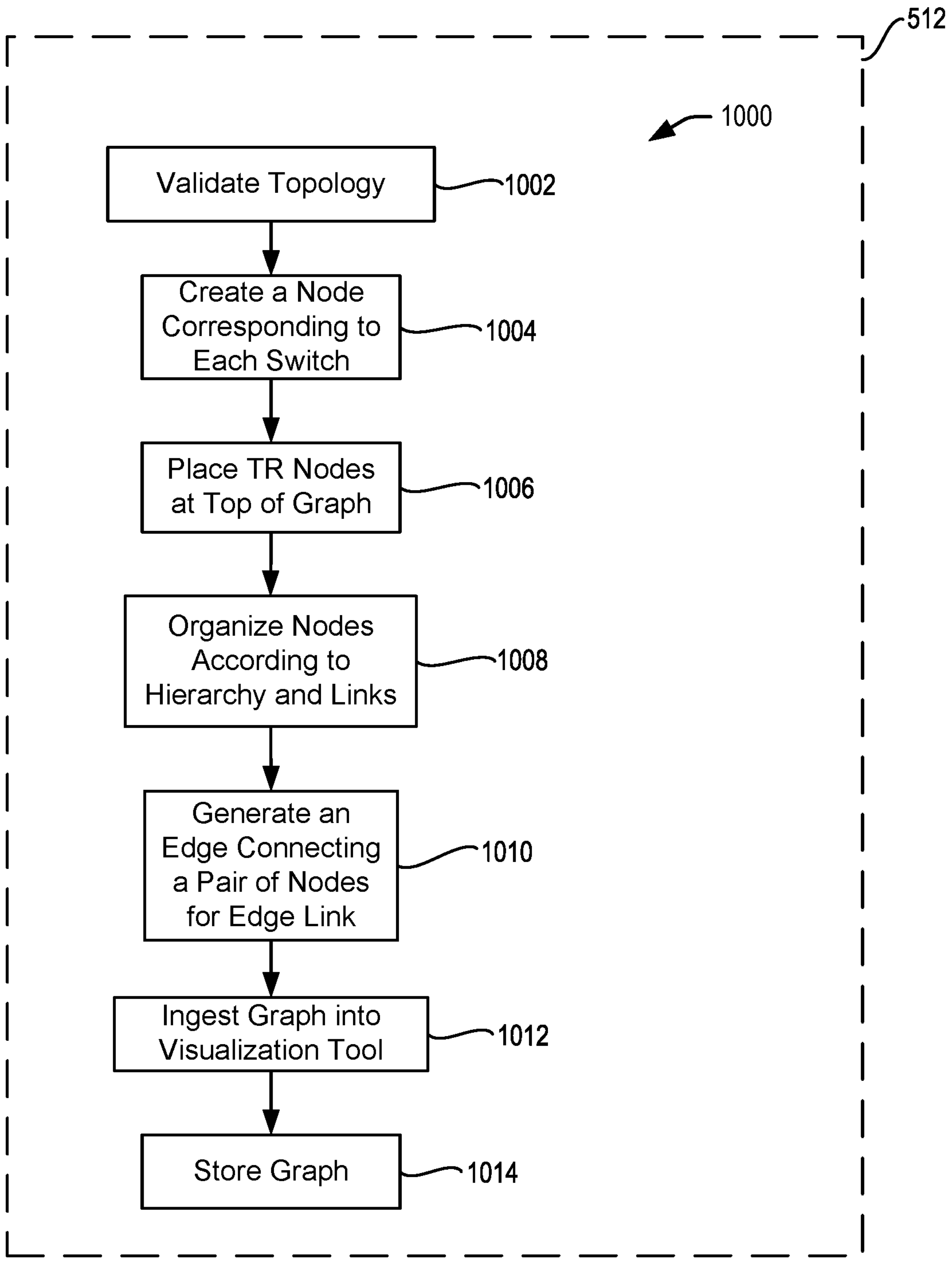
FIG. 11 is a flowchart illustrating one embodiment of a process for creating a graph.

With reference now to FIG. 11, a flowchart illustrating one embodiment of a process 1000 for creating a graph is shown. The process 1000 can be performed as a part of, or in the place of step 512 of FIG. 5. The process 1000 begins at block 1002, wherein the topology is validated. At block 1004, a node corresponding to each switch in the computing network 102 is created. At block 1006, nodes corresponding to the TR routers are placed at the top of the graph. At 1008, the remaining nodes are organized according to the hierarchy of the computing network 102 and the links between devices. At block 1010, edge are generate connecting nodes. In some embodiments, each edge represents a link, and each edge connects a pair of nodes. At block 1012, the graph is ingested into a visualization tool, which visualization tool generates a visual form of the graph, also referred to herein as the topology graph. At block 1014, the graph, and in some embodiments, the topology graph is stored in the topology database. In some embodiments, this can be performed as outlined below:

Topology Graph Creation

Once all links are created, create a graph as follows.

- i) Check and validate the topology
  - ensure proper switch count at each layer of the CLOS network
  - peer links are configured on leafs
  - uplinks are configured on tr and leaf devices
  - Sufficient ports are available (from device capability files) to create the topology
- ii) All switches as nodes of the graph
- iii) Transit Routers are the top nodes of the graph
- iii) All links as edges of the graph
- iv) Return the graph for the visualization tool.
- v) Save the graph in the SQLite database under respective tables.

The automation system writes the inventory of all the devices in a "clos-inventory" file in a format required by ansible, so that ansible can further manage the file.

Network engineers or network administrators maintain the order and connect specific links from upstream devices to downstream devices and vice versa. For example, in a three-tier topology, four leaf devices can be connected to one fabric device. The four fabric facing ports of Leaf1 can get connected to the first four interfaces of the fabric, Leaf2 to the next four interfaces of the fabric, . . . and so on. The automation is supplied with the vendor and model of each of the device types and the symmetric connectivity specifications. The automation systems can build a symmetric map of the topology with the YAML files supplied above. A device library may be supplied which contains the model specific device interface lists and the automation auto creates interfaces and links using the device library.

Sample leaf device with server and fabric facing interface dictionary is mentioned below. In certain embodiments, the automation system uses the interfaces in the order to generate the topology.

File: qfx5100-36q.yaml device:
  function: switch
  vendor: juniper
  model: qfx5100-48-6q
  ports: 54
  linecards: 0
  initial linecard: 0
  asics: 0
  initial_asic: 0
  port_driver: xe
  uplink driver: et

```
interfaces:
  id: 0
    name: xe-0/0/0
  id: 1
    name: xe-0/0/1
  id: 2
    name: xe-0/0/2
  id: 3
    name: xe-0/0/3
  id: 4
    name: xe-0/0/4
  id: 5
    name: xe-0/0/5
  id: 6
    name: xe-0/0/6
  id: 7
    name: xe-0/0/7
  id: 8
    name: xe-0/0/8
  id: 9
    name: xe-0/0/9
  id: 10
    name: xe-0/0/10
  id: 11
    name: xe-0/0/11
  id: 12
    name: xe-0/0/12
  id: 13
    name: xe-0/0/13
  id: 14
    name: xe-0/0/14
  id: 15
    name: xe-0/0/15
  id: 16
    name: xe-0/0/16
  id: 17
    name: xe-0/0/17
  id: 18
    name: xe-0/0/18
  id: 19
    name: xe-0/0/19
  id: 20
    name: xe-0/0/20
  id: 21
    name: xe-0/0/21
  id: 22
    name: xe-0/0/22
  id: 23
    name: xe-0/0/23
  id: 24
    name: xe-0/0/24
  id: 25
    name: xe-0/0/25
  id: 26
    name: xe-0/0/26
  id: 27
    name: xe-0/0/27
  id: 28
    name: xe-0/0/28
  id: 29
    name: xe-0/0/29
  id: 30
    name: xe-0/0/30
  id: 31
    name: xe-0/0/31
  id: 32
    name: xe-0/0/32
  id: 33
    name: xe-0/0/33
  id: 34
    name: xe-0/0/34
  id: 35
    name: xe-0/0/35
  id: 36
    name: xe-0/0/36
  id: 37
    name: xe-0/0/37
  id: 38
    name: xe-0/0/38
  id: 39
    name: xe-0/0/39
  id: 40
    name: xe-0/0/40
  id: 41
    name: xe-0/0/41
  id: 42
    name: xe-0/0/42
  id: 43
    name: xe-0/0/43
  id: 44
    name: xe-0/0/44
  id: 45
    name: xe-0/0/45
  id: 46
    name: xe-0/0/46
  id: 47
    name: xe-0/0/47
  id: 48
    name: et-0/0/48
  id: 49
    name: et-0/0/49
  id: 50
    name: et-0/0/50
  id: 51
    name: et-0/0/51
  id: 52
    name: et-0/0/52
  id: 53
    name: et-0/0/53
```

Build Maps

Map building can include the generation of a DNS map and/or a cable map. In some embodiments, the building of a cable map can be combined with the mapping of links in block 504. Further details of the creation of cable maps are discussed at length above with respect to step 504 of FIG. 5. In some embodiments, map building can include the building of a DNS map. One embodiment of the creation of a DNS map is described below. In such an embodiments, the modelling system can setup the DNS server with the right entries to each of switches using the host FQDN Name. This can include the following steps:

1. After the IP address are allocated, take the following action.
2. Walk through the device list (tr, spine, fabric and leaf)
   - i) Query the IP DB, management IP allotted table for IP address management interface on the device
   - ii) print management IP and the device FQDN (host name+domain) in a file "dns.txt"
3. Append "dns.txt" to "/etc/hosts" of the given AD's DNS server The DNS server will resolve the device to management IP allotted and all devices can be reachable via DNS name.

ZTP Setup

In some embodiments, ZTP links can be setup and/or generated as described below.

The ZTP process consists of preparing ZTP for leafs, fabric and spines.

1. The automation software bootstraps a DHCP server either locally or remotely which can be reached by the switches in the network.

On the DHCP server, all the device configuration files are copied under "/var/www/html/config/" directory. The switches can download the file from this folder via http using DHCP options.

2. Following is the algorithm to find the configuration file for a switch.

i) Connect the Switches to the peer switches according to the topology and also connect them to management switch so they can reach DHCP sever.

ii) Initially TR routers can be powered on and provisioned manually.

Subsequently, spine, fabric and leaf devices can be powered-on in hierarchical order. The parent device can be powered-on in CLOS network hierarchy before powering on the children.

The hierarchy can be as follows.

<tr>--<fabric>--<spine>--<fabric>--<leaf> iii) The factory default configuration comes with ZTP (zero touch provisioning) enabled. ZTP uses DHCP internally.

Each switch (in the pair in case of virtual chassis) independently broadcasts DHCP discover messages during boot up process and this message reach the DHCP sever which responds with all the needed info like configuration, firmware upgrade to etc.

iv) DHCP server to allocate temporary IP address from the pool allocated to it to each of the switches.

It will download initial configuration which enables LLDP on the Switch. The IP pool used by DHCP is different from the IP pools used by links, loopback or management IP above.

v) On DHCP server, this automation process creates the symbolic link to given configuration file by encoding its location information in the configuration file name. The location information. Is encoded with the parent hostname and peer interfaces it's connected. This will help DHCP server in deriving correct configuration files which are stored in DHCP server.

vi) Once LLDP is enabled, the switch will learn the parent hostname and peer interfaces it's connected.

The switch can use the parent hostname and peer interfaces to identify and/or download a corresponding configuration file on the DHCP server.

vii) The switches downloads corresponding configuration files from the DHCP server and the switches load those production configuration files and come online Build and Deployment The automation system will digest the Fabric definitions, rack and host file and generate the final configuration for all the devices in the CLOS topology. The host level settings take the highest precedence.

In certain embodiments, any change may require a configuration generation for the whole network. The automation system (e.g., NDS) auto propagates the change to all nodes that are affected and deploys the effected devices.

The embodiments described above provide several technical innovations over existing/conventional systems. For example, the fabric build process described above is new and applicable to any cloud network using a CLOS topology. The network administrators need not manage hostname or DNS. The automation will auto generate and auto populate the hostname and DNS maps. From a perspective of vendor agnostic network management, network administrators need not be aware of the vendor and do not directly operate on the device. Adding or deleting of devices is very easy by just editing the YAML model files. After devices are physically placed, they can be enabled in the YAML input files, build the config and push that to the given AD. The tasks associated with managing network links, like enabling or disabling of interfaces, power shut down of unused ports, and network and route management can be achieved by just changing the knobs defined in the YAML source files. The generated topology can be used by network visualization and network monitoring services for troubleshooting.

Automated Configuration File Creation

Figure 12:
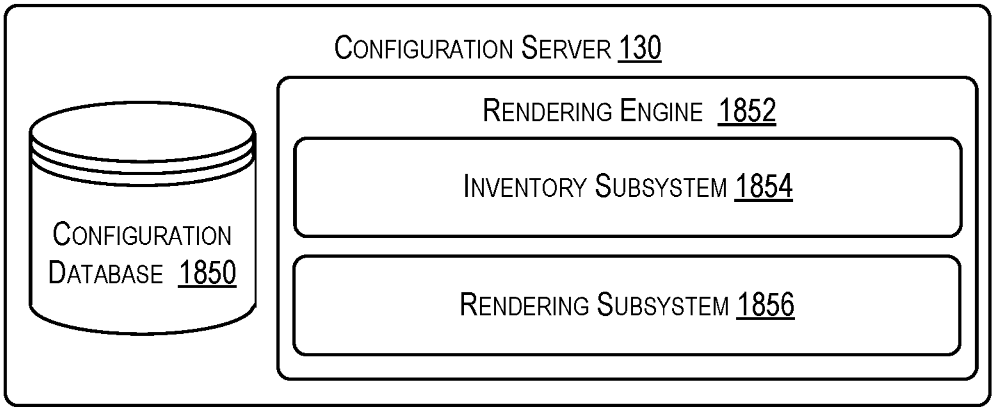
FIG. 12 is a functional schematic of one embodiment of the configuration server.

With reference now to FIG. 12, a functional schematic of one embodiment of configuration server 130 is shown. The configuration server 130 can include a rendering engine 1852 which can include an inventory subsystem 1854 and/or a rendering subsystem 1856, and a configuration database 1850.

The rendering engine 1852 can be embodied in hardware or software within the configuration server 130. The rendering engine can receive a data output comprising information characterizing attributes of one or several devices within a computing network, information characterizing one or several static overrides, and one or several templates, and can, from these, create a configuration file for each of the one or several devices. In some embodiments, this configuration file can be specific to attributes of those one or several devices. In some embodiments, a configuration file generated by the rendering engine 1852 is ready for loading onto the associated device, and in some embodiments, can be the configuration loaded onto the device in process described herein such as, for example, step 516 of process 500 of FIG. 5.

The rendering engine can include the inventory subsystem 1854, also referred to herein as the inventory processor 1854. The inventory subsystem 1854 can convert the received output and one or several static overrides into a data file. This data file can characterize each of the plurality of devices in the computing network.

In some embodiments, this data file can be created by the hierarchical application of attributes specified in the received data and/or the static overrides. These attributes can be settings. For example, a location may be associated with the first set of settings, a role within the computing network may be associated with a second set of settings, and I device type may be associated with a third set the settings. In some embodiments, these settings can be hierarchically applied such that, for example, if there is a conflict between a lower level setting and a higher level setting, the higher level setting is included in the data file.

In some embodiments, for example, location-based settings can have the lowest level in the hierarchy, role-based settings can have a lower intermediate level in the hierarchy, group-based settings can have a higher intermediate level in the hierarchy, and device-based settings can have the highest level in the hierarchy. Further, location-based settings may be further subdivided. For example, the following location-based settings are listed in order of increasing level in sub-hierarchy such that global settings have the lowest level, region settings, which region may correspond to, for example, a city, state, county, or the like, have a lower-intermediate level, data center settings, which are specific to one or several data centers, have a higher-intermediate level, and unit settings, which are specific to a portion of a data center, have a highest level.

The static overrides can be further organized according to a hierarchy, such that static overrides of a higher level override static overrides of a lower-level. In some embodiments, the static overrides can include group overrides and host overrides. Group overrides, which are relevant to a group of devices, have a lower hierarchical level as compared to host overrides which are specific to a device in the computing network.

Thus, the creation of the data file can include the identification of settings from different layers of the hierarchy and the combination of these settings according to the hierarchy. This can include, for example, first, from the received data, identifying location-based settings, overlaying role-based settings, followed by group-based settings, and then device-based settings. Additionally, static overrides can be applied such that group overrides our first applied, followed by host overrides.

The result of the merging of these settings for a single device can be a dictionary object for the device. Dictionary objects for all of the devices identified in the received data can be combined into a single dictionary, which can be the data file, and/or which can be converted into the data file. In some embodiments, for example, this single dictionary can be the data file, and specifically can be a JSON data file and/or can be converted into the data file, and specifically can be converted into a JSON data file. Thus, in some embodiments, the data file, which can comprise a JSON file, can be generated based on the received data and on a set of static overrides.

The rendering engine can include a rendering subsystem 1856. The rendering subsystem 1856 can receive the data file from the inventory subsystem 1854 and can, based on the received data file, generate a configuration file for each of the plurality of devices in the computing network. In some embodiments, these configuration files can be generated via iterative selection and application of templates to portions of the data file by the rendering engine.

The configuration database 1850 can be a subset of the storage 124 and/or can be distinct from the storage 124. In some embodiments, the configuration database 1850 can store information used by and/or generated by the rendering engine 1852. This can include the data file generated by the inventory subsystem 1854 and/or the configuration files generated by the rendering subsystem 1856. In some embodiments, this can further include storing data generated at intermediate steps in the generation of the data file and/or the configuration files.

Figure 13:
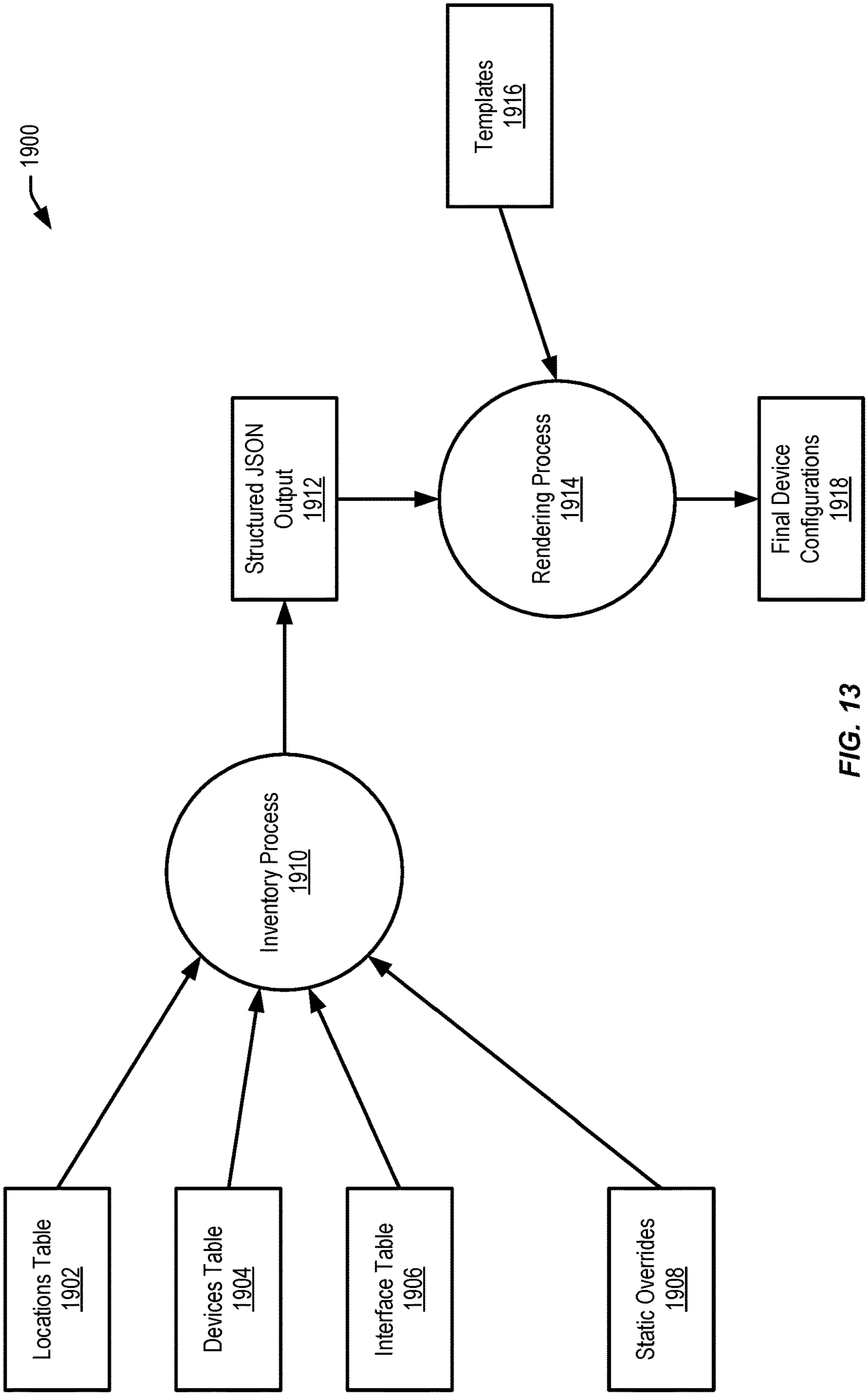
FIG. 13 is a schematic illustration of one embodiment of a process for automated generation of configuration files for devices in a computing network.

In some embodiments, the configuration database 1850 can include one or several overrides including, for example, one or several static overrides. Specifically, the configuration database can include information characterizing these one or several static overrides. Be static overrides can include, for example, one or several group overrides and/or one or several host overrides. In some embodiments, application of these overrides can be according to one or several definitions files. For example, a group override may be associated with a group definitions file. A group definitions file can be created and/or modified by an operator to create a definition of a group and thereby bundle one or several devices into a group. Thus, the group definitions file can include one or several rules for determining inclusion of a device in the group. The group definitions file can further include and/or be associated with group settings. These group settings identify one or several attributes of devices in the group, which attributes can override any default attributes and/or With reference now to FIG. 13, a schematic illustration of one embodiment of a process 1900 for automated generation of configuration files for devices in a computing network is shown. An inventory process 1910, which can be the process performed by, for example, the inventory subsystem 1854 can receive data characterizing a plurality of devices in one or several computing networks. This can include receiving data from one or several tables and/or databases, and specifically, as shown in FIG. 13, receiving information from the locations table 1902, the devices table 1904, and/or the interface tables 1906. The inventory process can further receive information characterizing one or several static overrides 1908.

The inventory process 1910 can, based on the information and one or several relevant static overrides, create a distinct code array and/or a dictionary object for each of the plurality of devices in the computing network. In some embodiments, each of these dictionary objects may be unique, and in some embodiments, some or all of the dictionary objects may be the same. For example, if there are two identical devices within the computing network and performing identical functions within the computing network, their dictionary objects may be the same, however, each of those identical devices can have a distinct dictionary object.

In some embodiments, the inventory process 1910 can extract portions of the received data, which portions can be relevant to one of the plurality of devices in computing network. Based on these extracted portions of the received data and static overrides relevant to the device, the inventory process 1910 can generate a dictionary object for the device associated with the extracted portions of the received data. This can be repeated until a dictionary object has been generated for each of the devices for which data was received. These dictionary objects can then be merged and converted into a JSON file, which can be output as indicated in block 1912.

This JSON output can be received by the rendering process 1914, which can be the process performed by, for example, the rendering subsystem 1856. The rendering process can generate a configuration file for each of the plurality of devices for which data was received and/or that is represented in the JSON data file. This generation can be performed according to the iterative selection and application of templates 1916 to portions of the data file. For example, the rendering process can identify roles indicated within the data file, and can, for each role, identify the devices having that role. The rendering process 1914 can then, apply templates relevant to that role to each of the devices having that role. This application of templates can include the retrieving of one or several plugins corresponding to all or portions of that role and running the plugin based on information received from the data file. The application of a template to a portion of the data file associated with a device can result in the generation of a snippet of a configuration file for that device.

This application of templates relevant to a selected role can be repeated for each role until configuration snippets have been generated for all of the roles identified in the data file. The device associated with each of the configuration snippets can be identified, and the configuration snippets for a device can be aggregated into a configuration file. In some embodiments, this aggregation of the configuration snippets can be according to an aggregation logic which can be specific based on one or several attributes of the device associated with the configuration snippets. In some embodiments, the aggregation of these configuration snippets can include identifying the device associated with the configuration snippets, identifying any aggregation logic or rules governing the aggregation of the configuration snippets, and aggregating the configuration snipes for the device according to any identified aggregation logic or roles for that device. The aggregated configuration for a device can be output by the rendering process 1914 as a final device configuration 1918 for that device. An example of such aggregation logic is shown below.

```
---
# by referencing the 'common' role in the platform specific plays this task
# is executed it causes Ansible to generate the common part of the
# configuration for a host
#
# ansible assembles files based on file names in alphabetical order
# we add a number in front to make sure it is ordered as we want
# 110: system related config
# 120: interface related configuration
# 130: service related config, i.e. netflow
# 140: routing protocols
#
- include_vars: "{{ auto_dir }}/config/{{ coords.env }}/{{ coords.dc
}}/{{ coords.unit }}/oob-definitions.yaml"
- name: Building common system configuration
  template: >
    src={{ vendor }}/system.j2
    dest={{ auto_dir }}/{{ tmp_dir }}/{{ inventory_hostname
    }}/110_system.conf.part
- name: Building common AAA configuration
  template: >
    src={{ vendor }}/aaa.j2
    dest={{ auto_dir }}/{{ tmp_dir }}/{{ inventory_hostname
    }}/115_aaa.conf.part
- name: Building common interface configuration
  template: >
    src={{ vendor }}/interface.j2
    dest={{ auto_dir }}/{{ tmp_dir }}/{{ inventory_hostname
    }}/120_interface.conf.part
- name: Building common netflow configuration
  template: >
    src={{ vendor }}/netflow.j2
    dest={{ auto_dir }}/{{ tmp_dir }}/{{ inventory_hostname
    }}/130_netflow.conf.part
- name: Building common SNMP configuration
  template: >
    src={{ vendor }}/snmp.j2
    dest={{ auto_dir }}/{{ tmp_dir }}/{{ inventory_hostname
    }}/140_snmp.conf.part
- name: Remove unused FEX configs
  template: >
    src={{ vendor }}/fex.j2
    dest={{ auto_dir }}/{{ tmp_dir }}/{{ inventory_hostname
    }}/150_fex.conf.part
```

Figure 14:
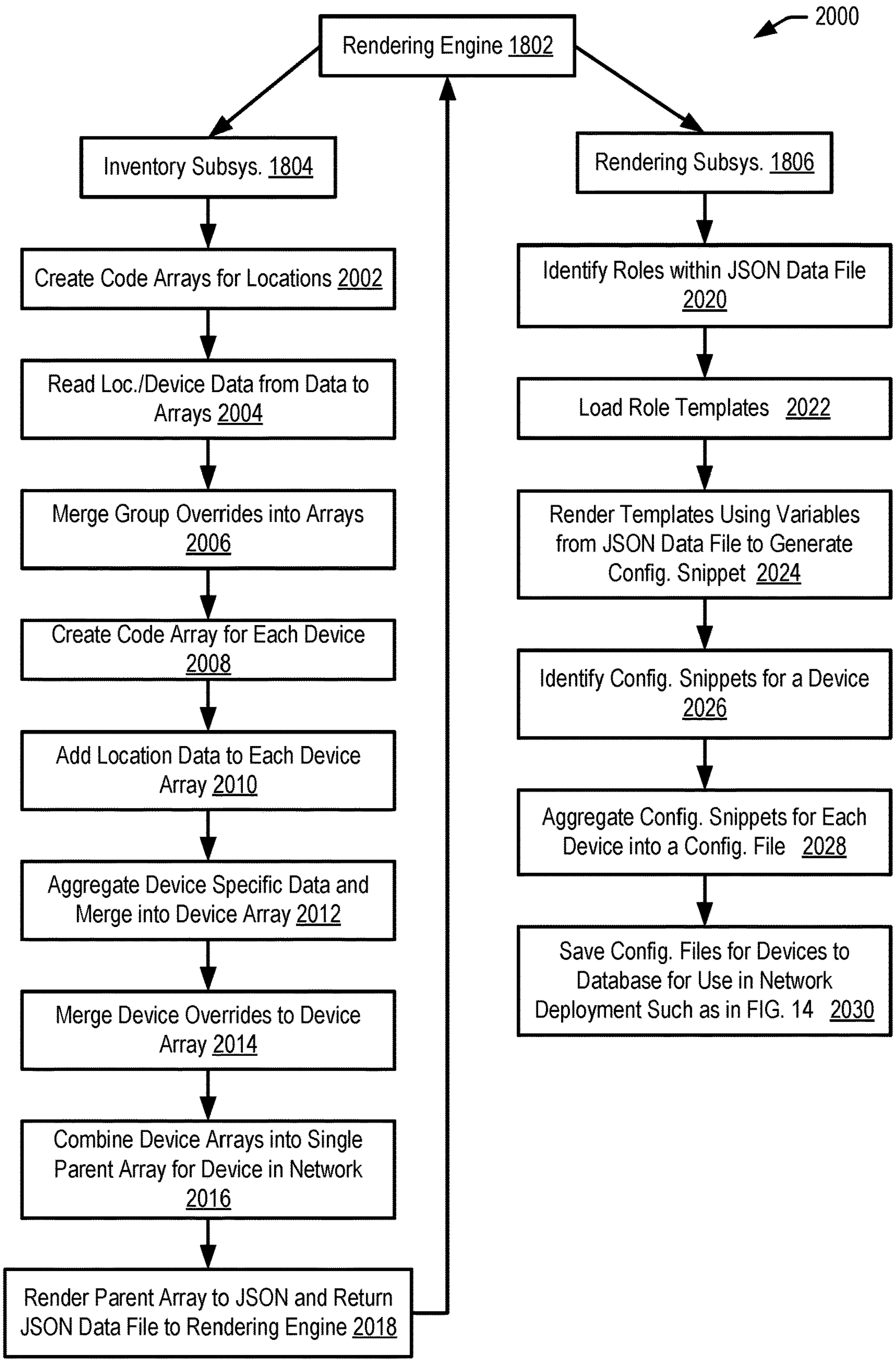
FIG. 14 is a flowchart illustrating one embodiment of a process for automated configuration generation.

With reference now to FIG. 14, a flowchart illustrating one embodiment of a process 2000 for automated configuration generation is shown. The process can be performed by, for example, the configuration server 130. The process 2000 can be triggered by the rendering engine 1852, which can direct the inventory subsystem 1854 to perform the inventory process 1910 represented in FIG. 14 by 2002 through 2018.

At block 2002, the inventory subsystem 1854 can receive data, which can include data relating to a plurality of devices in the computing network. The inventory subsystem 1854 can then create code arrays, in other words, a plurality of dictionaries or dictionary objects, for locations identified in the received data.

At block 2004 location and/or device data is read from the received data into the dictionary objects. This can include retrieving tables from the storage 124, including, for example, the locations table 1902, the devices table 1904, the interface table 1906, and/or any other tables in storage 124. The information from these tables is read and used to generate a dictionary object for each device in the received data, and more specifically, in the computing network and represented in the received data.

In some embodiments, this can include reading the location data in the received data, and specifically in the locations table 1902, into dictionary objects starting with the least specific (global data) and progressing to the most specific, including, first domain, then data center, and finally specific network. Each progression through the locations data causes the overlaying of settings from least specific to most specific location data. In some embodiments, and as a part of the step of block 2004, one or several dictionary objects are created, which dictionary objects contain all of the location data specific to the devices within the computing network for which a configuration file is automatically created. This progression through the location data can be performed until the dictionary object(s) for the location data contains all of the location data.

At block 2006 relevant static overrides are merged into the created dictionary object. This includes determining whether there are static overrides relevant to the dictionary objects for locations. If one or several relevant static overrides are identified, then these overrides can be read and applied to the dictionary object(s).

At block 2008, a device dictionary object is created for each of the devices represented in the received data and/or in the computing network and represented in the received data. At step 2010, location data from the location dictionary object relevant to the device represented by the device dictionary object is added to the device dictionary object.

At block 2012 information from any of the received data and/or from any of the tables containing received data and relevant to a device is added to that device's device dictionary object. In some embodiments, this can include the retrieving of that received data and identifying portions of that received data relevant to selected device. This can include retrieving one or several tables, such as the tables contained in storage 124, and extracting data in those tables relevant to the selected device. In some embodiments, this can include querying device specific data from the storage 124, and specifically from one or several of the tables in storage 124, and reading this data, through overwriting of any conflicting location data, into the device's device dictionary object. This can, in some embodiments, result in the creation of a device dictionary object containing all data relevant to that device. This can be repeated for all of the device dictionary objects for devices for which a configuration file is automatically being generated.

At block 2014 the device dictionaries are modified according to static overrides relevant to those device dictionaries. This can include, for example, applying group overrides to devices belonging to a group, and/or applying device specific overrides. In some embodiments, this can include identifying a device and querying the configuration database 1850 for overrides relevant to that device.

At block 2016, the device dictionary objects are combined into a single, parent dictionary. This single parent dictionary can, in some embodiments, comprise the data file and can represent all of the devices represented in the received data and/or in the computing network.

In some embodiments, this parent dictionary can include data representative of all of the devices for which a configuration file is automatically generated. The dictionary can, in some embodiments, contain: metadata, data identifying a vender/device/role for each device, interface attributes, chassis attributes, flow settings protocol settings, VRF settings, and/or VLAN settings for all of the devices represented in the received data and/or for which a configuration file is being automatically generated. At block 2018, the parent array is rendered to JSON. In some embodiments, the JSON data file can be returned to the rendering engine.

The rendering engine 1802 can direct the rendering subsystem 1806 to perform the rendering process 1914 as represented by blocks 2020 through 2030. At block 2020, the JSON data file is received and evaluated, and roles within the data file can be identified. At block 2022, templates relevant to the identified roles can be loaded. In some embodiments, each of these templates can comprise a plugin. In some embodiments, each of these templates can be Jinja template.

At block 2024, each of the templates is rendered using variables from the data file, and specifically from the JSON data file. The rendering of a template can generate a configuration snippet, which can comprise a portion of a configuration file. This can result in the generating of a configuration file snippet for each of the plurality of devices in the computing network via iterative selection and application of templates to portions of the data file. This can include identifying roles identified in the data file and, for each role identified in the data file, identifying devices associated with the identified role and generating a configuration snippet for each of the identified devices associated with the identified role.

In some embodiments, block 2024 can include, identifying a role and all of the devices having that role. Devices having that role can be iteratively selected and the template can be rendered for each of those devices based on information from that device's device dictionary object. This can be repeated, until a configuration snippet has been generated for each device having a role, at which point, another role can be selected and configuration snippets can be rendered for each device having that role. Roles can be selected and configuration snippets can be rendered for the devices having the selected role, until all of the roles have been selected and had configuration snippets rendered for devices having that role.

At block 2028, the configuration snippets for each device can be identified and aggregated. Thus, as a part of generating a configuration file for each of the devices, a plurality of configuration snippets, also referred to herein as configuration file segments, relevant to the one of the devices can be identified, and the configuration snippets in this plurality of configuration snippets can be merged to form the configuration file. In some embodiments, this can be performed for each device for which a configuration file is being automatically generated. Thus, for each device, relevant configuration snippets can be identified, and can then be aggregated to form a configuration file.

At block 2030, the configuration files generated in block 2028 can be saved. In some embodiments, these configuration files can be saved to, for example, the configuration database 1850, and/or to the storage 124. In some embodiments, these configuration files can then be used in a network deployment such as is described in FIG. 14.

Figure 15:
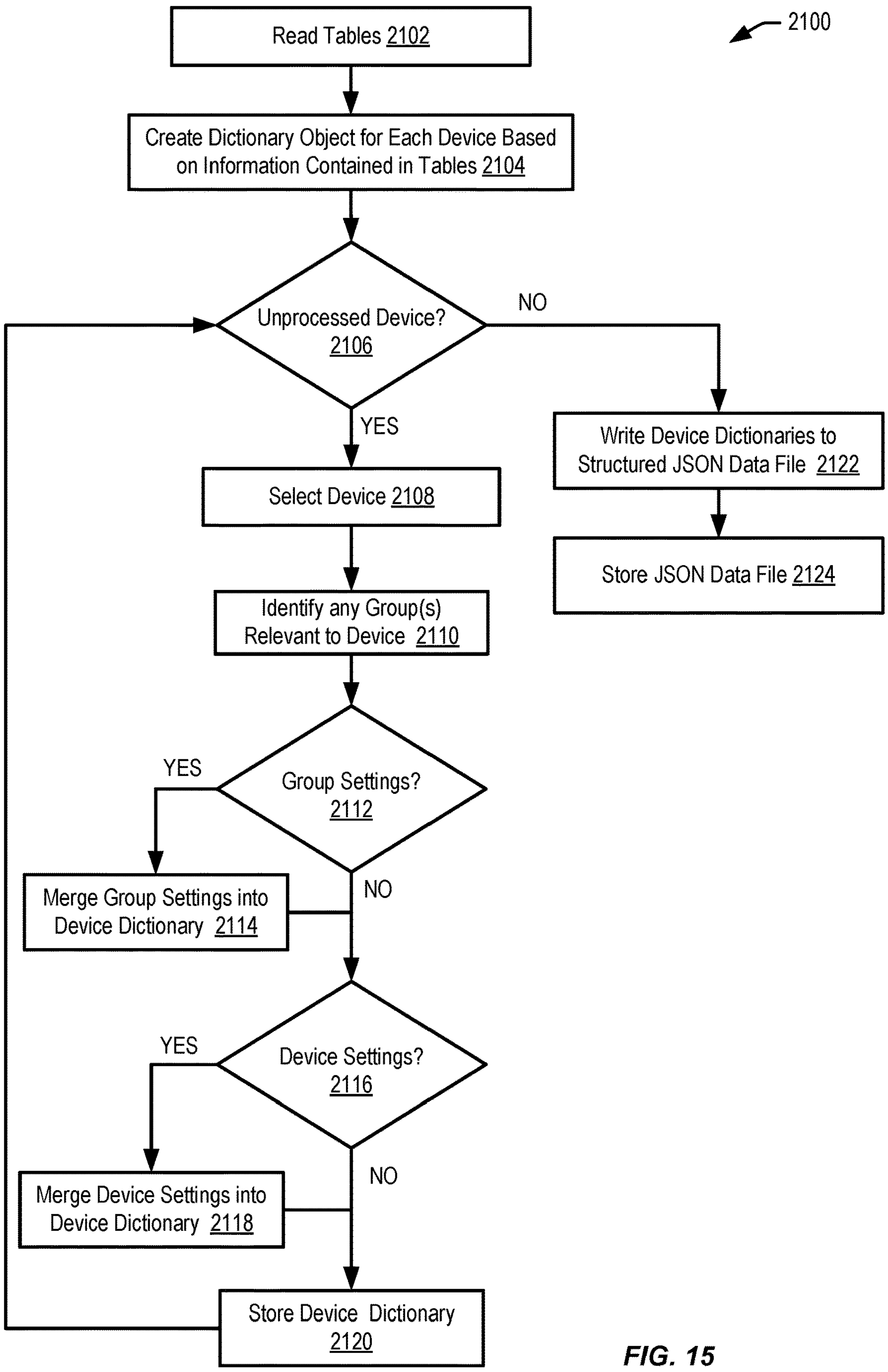
FIG. 15 is a flowchart illustrating one embodiment of a process for generating the data file.

With reference now to FIG. 15, a flowchart illustrating one embodiment of a process 2100 for generating the data file is shown. In some embodiments, the process 2100 can be performed as a part of, or in the place of the inventory process 1910. The process 2100 begins at block 2102, wherein tables are read. In some embodiments, this can include retrieving and/or receiving data from the storage 124, which data can comprise one or several databases and/or tables including, for example, the locations table 1902, the devices table 1904, the interface tables 1906, and/or any other tables in storage 124.

At block 2104, a device dictionary object is created for each device for which a configuration file is to be automatically generated. In some embodiments, this device dictionary object can be created based on information read in block 2102, and/or based on information contained in one or several databases and/or tables.

The process 2100 can then iterate over each device. More specifically, the process 2100 proceeds to block 2106, wherein it is determined if there is a device for which a device dictionary object has not been completed. If it is determine that there is such an unprocessed device, then the process 2100 proceeds to block 2108, wherein one of such unprocessed devices is selected.

The process proceeds to block 2110 through 2118, wherein it is determined if one or several static overrides are relevant to the device. In some embodiments, this can include identifying at least one of the set of static overrides relevant to the one of the plurality of devices in computing network, and then merging the dictionary object for the one of the plurality of devices in the computing network with the at least one of the set of static overrides. In some embodiments, this static override can be at least one of a group override, and a host override. In some embodiments, this group override can be relevant to a plurality of devices in the computing network and belonging to a common group. In some embodiments, the device override can be relevant to a device within the computing network, and specifically can be relevant to one device within the computing network. Any identified relevant static override can be merged with the dictionary object, and in the event that there is a conflict between a group override and a device override, the device override can be applied to the dictionary. In other words, the device override can overwrite the group override and/or be merged with the dictionary object.

Specifically, the process 2100 can proceed to block 2110, wherein any group(s) relevant to the selected device are identified. In some embodiments, this can include determining if the device meets the criteria of belonging to any of the groups, and specifically if the device meets the criteria of any group definition as specified in an associated group definition file. In some embodiments, this can include running a policy associated with the group and/or which policy implement evaluates a device for compliance with the group definition. A group is identified as relevant to the device if the device matches the group policy, or in other words, if the device meets criteria for belonging to the group. All groups relevant to the device can be identified.

At decision step 2112, it is determined if there are any group settings relevant to the device. This can include, evaluating any groups identified as relevant to the device to determine if they have any settings relevant to the device. In some embodiments, this determination can include querying the configuration database 1850 to determine if there are any settings associated with any groups relevant to the device. If it is determined that there are relevant group settings, then the process 2100 proceeds to block 2114, wherein the group settings, and more specifically, wherein the relevant group settings are merged into the device dictionary object. In other words, these relevant group settings overwrite any conflicting corresponding setting in the device dictionary object and/or populate any empty corresponding setting in the device dictionary object.

After merging the group settings into the device dictionary object, or if it is determined that there are no relevant group settings, the process 2100 proceeds to decision step 2116, wherein it is determined if there are any relevant device settings. In some embodiments, this can include querying the configuration database 1850 to determine if there are any device settings for the selected device.

If there are relevant device settings for the device, then the process 2100 proceeds to block 2118, wherein the relevant device settings are merged into the device dictionary object. In other words, these relevant device settings overwrite any conflicting corresponding setting in the device dictionary object and/or populate any empty corresponding setting in the device dictionary object. This can include, in some embodiments, overwriting one or several conflicting corresponding settings arising from relevant group settings.

After the merging of the device settings into the device dictionary object, or if it is determined that there are no relevant device settings, the process 2100 proceeds to block 2120, wherein the device dictionary object is stored. In some embodiments, the device dictionary object can be stored in the configuration database 1850.

The process 2100 then returns to decision step 2106 to determine if there remain any unprocessed devices. If there are remaining unprocessed devices, then the process 2100 proceeds as outlined above. Alternatively, if it is determined that there are no remaining unprocessed devices, then the process 2100 proceeds to block 2122, wherein the device dictionary objects are aggregated to form a data file. This data file can then be written as a JSON file and specifically, as a structured JSON file. In some embodiments, for example, the data file can identify a plurality of roles and, for each role, can identify the devices having that role. In some embodiments, the data file can further include a Hostvars JSON item per device, and, for each device the data file can include a service name, one or several attribute dictionaries, and identification of services provided by that device. One embodiment of such an exemplary JSON file is shown below.

```
{
"_meta": {
  "hostvars": {
    "xxxx-c1u1-fabric-1.uspp1.oraclecloud.com": {
      "active": true,
      "as_number": 64721,
      "bgp_key": "abc123",
      "bgp_key_hash": {
      "cisco": "xxxxxxxxxxxx",
      "juniper": "xxxxxxxxxxxx"
      },
      "cablemap": true,
      "cablemap_file": "cabling.csv",
      "cablemap_format": "csv",
      "country": "US",
      "dc": "xxx12",
      "dc_dir": "/ansible/environments/uspp1/xxx12",
      "deploy_dir": "/ansible/environments/uspp1/xxx12/
      c1u1/templates",
      "deployed": true,
      "dns_domain": "uspp1.oraclecloud.com",
      "dnsmap": true,
      "dnsmap_file": "dns.txt",
      "dnsmap_format": "txt",
      "domain_code": "pp1",
      "enabled": true,
      "env": "uspp1",
      "env_dir": "/ansible/environments/uspp1",
      "ethernet_mtu": 9192,
      "fabric_100g": false,
      "fabric_100g": false,
```

-continued

```
"fabric_bgp": [
  {
    "address": "172.17.195.40",
    "as_number": 64722,
    "enabled": false,
    "name": "xxx12-c1u1-spine-12",
    "type": "spine"
  }, "fabric_type": "ThreeTier",
"filters": [ ],
"flow_collectors": [
  {
    "flow_type": "'sflow",
    "ip": "10.36.129.254",
    "port": 6343
  },
  {
    "flow_type": "netflow",
    "ip": "10.36.129.252",
    "port": 2055
    }
],
"graph_file": "fabric.png",
"graph_names": true,
"hostname": "xxx12-c1u1-fabric-1",
"interface_groups": 2,
"interfaces": [
    {
    "dc": "xxx12",
    "description": "xxx12-c1u1-spine-1 - et-0/0/0",
    "enabled": true,
    "env": "uspp1",
    "id": 0,
    "ipv4_addr": [
      "172.17.192.17/31"
    ],
    "link id": 1,
    "mode": "13"
    "mpls_enabled": true,
    "name": "et-0/0/0",
    "parent": "None",
    "subint": 0,
    "type": "physical",
    "unit": "c1u1"
  },
  {
    "dc": "xxx12",
    "description": "xxx12-c1u1-spine-2 - et-0/0/0",
    "enabled": false,
    "env": "uspp1",
    "id": 1,
    "ipv4_addr": [
      "172.17.192.89/31"
    ],
    "link_id": 37,
    "mode": "13",
    "mpls_enabled": true,
    "name": "et-0/0/1",
    "parent": "None",
    "subint": 0,
    "type": "physical",
    "unit": "c1u1"
  },
"ipfix_settings": {
  "flow_active_timeout": 60,
  "flow_inactive_timeout": 15,
  "option_refresh_rate": 10,
  "sample_packet_rate": 1000,
  "sample_rate": 1000,
  "template_refresh_rate": 10
  },
  "ipv4_loopback_addr": [
      "172.16.8.20/32"
  ],
  "ipv4_mgmt_addr": [
      "10.36.128.30/23"
  ],
```

-continued

"ipv4_mgmt_gateway": "10.36.128.1",
"ipv4_mgmt_net": "10.36.128.0/23",
"is_odd": "True",
"links": "172.17.192.0/18",
"local_logins": {
"admin": {
"password_hash": {
"cisco": "xxxxxxxxxxxxxxx",
"cyclade": "xxxxxxxxxxxxxxx",
"servertech": "xxxxxxxxxxxxxxx"
}
},
"admn": {
"password_hash": {
"pdu": "xxxxxxxxxxxxxxx"
}
},
"netconf": {
"password_hash": {
"cisco": "xxxxxxxxxxxxxxx",
"cyclade": "xxxxxxxxxxxxxxx",
"pdu": ""xxxxxxxxxxxxxxx",
"servertech": "xxxxxxxxxxxxxxx",
}
},
"loopbacks": "172.16.8.0/22",
"model": "qfx10002-36q",
"name_servers": [
"10.193.137.102",
"10.227.45.71"
],
"ntp_servers": [
"10.86.100.10",
"10.86.100.12"
],
"radius_servers": [
{
"key": "xxxxxxxxxxxxxxx",
"secret": "xxxxxxxxxxxxxxx",
"server": "10.86.23.202"
},
{
"key": "xxxxxxxxxxxxxxx",
"secret": "xxxxxxxxxxxxxxx",
"server": "10.86.23.203"
}
],
"replace": false,
"rip_settings": {
"holddown": 10,
"route_timeout": 30,
"update_interval": 10
},
"root_hash": "xxxxxxxxxxxxxxx",
"sflow_settings": {
"adaptive_sample_rate": 3500,
"egress_sample_rate": 500,
"ingress_sample_rate": 500,
"polling_interval": 20
},
"snmp_client_lists": [
{
"members": [
"10.177.40.45/32",
"10.222.24.144/28",
"10.160.200.15/32",
"10.153.162.0/23",
"10.92.185.128/26".
"10.228.160.0/21",
"10.23.255.128/26",
"10.115.211.128/26",
"10.86.23.235/32",
"10.36.129.253/32".
"10.36.129.254/32",
"10.86.23.233/32",
"10.26.6.251/32",
"10.26.6.252/32", -continued "10.20.6.251/32",
"10.20.6.252/32",
],
"name": "Oracle"
}
],
"snmp_contact": "xxxxxxxxxxxxxxx",
"snmp_location": "xxxxxxxxxxxxxxx",
"snmp_polling": [
{
"client_list": "Oracle",
"community": "xxxxxxxxxxxxxxx",
"permissions": "read-write"
},
{
"client_list": "Oracle",
"community": "xxxxxxxxxxxxxxx",
"permissions": "read-only"
}
],
"syslog_servers": [
"10.222.24.82",
"10.236.130.4",
"10.86.100.241",
],
"syslog_servers_structured": [
"10.115.211.149",
"10.23.255.149",
"10.92.185.149"
],
]"timezone": "UTC",
]"tmp_dir": "/ansible/environments/uspp1/xxx12/clu1/tmp",
"type": "fabric",
"unit": "c1u1",
"unit_dir": "/ansible/environments/uspp1/xxx12/c1u1",
"vendor": "juniper",
"vlans": [
{
"name": "isp-vr",
"vlan_id": 10
},
{
"name": "xx2-oss-v620",
"vlan_id": 620
}
],
"vrfs": [
{
"bgp_peers": [
{
"address": "10.86.53.82",
"as": 64691
},
{
"address": "10.86.53.83",
"as": 64691
}
],
"interfaces": [
"irb.10"
],
"name": "isp-vr",
"rd": "65002:001001001",
"rt_export": [
"65002:001001001",
"65001:001001001"
"rt_import": [
"65002:001001001",
"65001:001001001"
],
],
"vlans": [
10
]
}, -continued

```
{
  "bgp_peers": [
    {
      "address": "10.86.53.91",
      "as": 64691
    },
    {
      "address": "10.86.53.90",
      "as": 64691
    }
  ],
  "interfaces": [
    "irb.620"
  ],
  "name": "pp1-oss-v620-1",
  "rd": "65002:011062001",
  "rt_export": [
    "65002:011062001",
    "64536:011062001"
  ],
  "rt_import": [
    "65002:011062001",
    "64536:011062001"
  ],
  "vlans": [
    620
  ]
 }
}
],
"vrrp_key": "vrrp4me"
},
. . .
. . .
"fabric": {
  "hosts": [
    "xxx12-c1u1-fabric-1.uspp1.oraclecloud.com",
    "xxx12-c1u1-fabric-2.uspp1.oraclecloud.com",
    "xxx12-c1u1-fabric-5.uspp1.oraclecloud.com",
    "xxx12-c1u1-fabric-6.uspp1.oraclecloud.com"
  ]
},
"leaf": {
  "hosts": [
    "xxx12-clu1-leaf-1.uspp1.oraclecloud.com",
    "xxx12-clu1-leaf-3.uspp1.oraclecloud.com",
    "xxx12-clu1-leaf-5.uspp1.oraclecloud.com",
    "xxx12-clu1-leaf-7.uspp1.oraclecloud.com",
    "xxx12-clu1-leaf-9.uspp1.oraclecloud.com",
    "xxx12-clu1-leaf-11.uspp1.oraclecloud.com"
  ]
},
"spine": {
  "hosts": [
    "xxx12-c1u1-spine-1.uspp1.oraclecloud.com",
    "xxx12-c1u1-spine-10.uspp1.oraclecloud.com"
]
},
"tr": {
  "hosts": [
    "xxx12-c1u1-tr-1.uspp1.oraclecloud.com",
    "xxx12-c1u1-tr-2.uspp1.oraclecloud.com"
  ]
}
```

At block 2124, the JSON data file is stored, and specifically, can be stored in the configuration database 1850.

Figure 16:
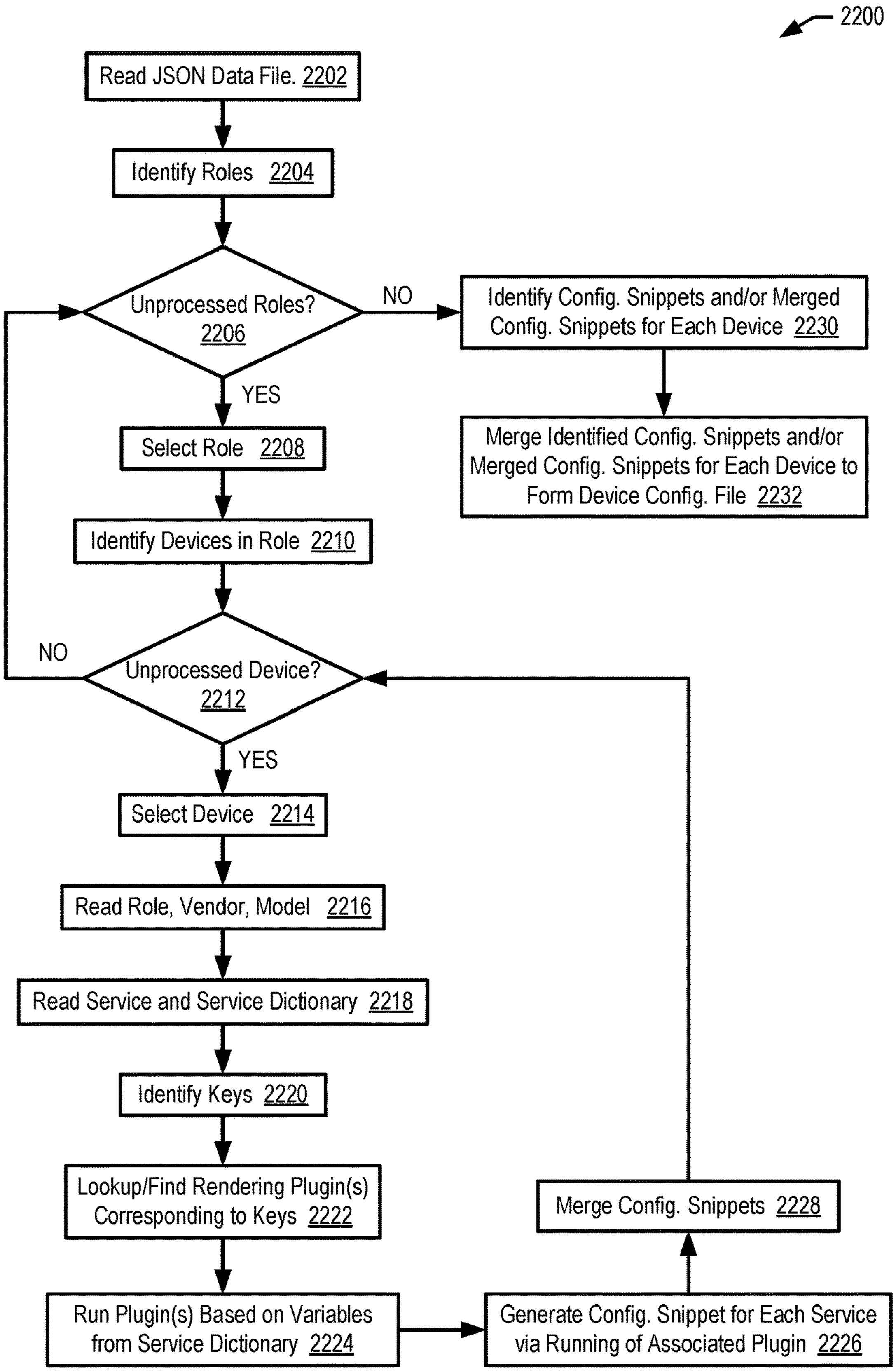
FIG. 16 is a flowchart illustrating another embodiment of a process for generating the data file.

With reference now to FIG. 16, a flowchart illustrating one embodiment of a process 2200 for generating the data file is shown. In some embodiments, the process 2200 can be performed as a part of, or in the place of the inventory process 1910.

The process begins at block 2202, wherein the data file, and specifically, wherein the JSON data file is read by the rendering subsystem 1806. The rendering engine 1856 can read the data file and can identify a role section within the data file. The rendering engine 1856 can then identify roles within the role section as indicated in block 2204. For example, the JSON file above, includes several roles, which are reproduced below, each of which identify a role and then a plurality of devices (hosts) fulfilling that role.

```
"fabric": {
  "hosts": [
    "xxx12-c1u1-fabric-1.uspp1.oraclecloud.com",
    "xxx12-c1u1-fabric-2.uspp1.oraclecloud.com",
    "xxx12-c1u1-fabric-5.uspp1.oraclecloud.com",
    "xxx12-c1u1-fabric-6.uspp1.oraclecloud.com"
  ]
},
"leaf: {
  "hosts": [
    "xxx12-c1u1-leaf-1.uspp1.oraclecloud.com",
    "xxx12-c1u1-leaf-3.uspp1.oraclecloud.com",
    "xxx12-c1u1-leaf-5.uspp1.oraclecloud.com",
    "xxx12-c1u1-leaf-7.uspp1.oraclecloud.com",
    "xxx12-c1u1-leaf-9.uspp1.oraclecloud.com",
    "xxx12-c1u1-leaf-11.uspp1.oraclecloud.com"
  ]
},
"spine": {
  "hosts": [
    "xxx12-c1u1-spine-1.uspp1.oraclecloud.com",
    "xxx12-c1u1-spine-10.uspp1.oraclecloud.com"
]
},
"tr": {
  "hosts": [
   "xxx12-c1u1-tr-1.uspp1.oraclecloud.com",
   "xxx12-c1u1-tr-2.uspp1.oraclecloud.com"
  ]
```

At block 2206, it is determined if there are any unprocessed roles, or in other words, if there are any roles for which steps 2208 through 2228 have not been performed.

If it is determined that there are unprocessed roles, then the process 2200 proceeds to block 2208, wherein one of the unprocessed roles is selected. The devices associated with this role are then identified as indicated in block 2210. In steps 2212 through 2228, the process iterates through devices associated with a selected role to generate configuration snippets for the devices associated with the selected role.

At decision step 2212, it is determined if there are any devices with associated with the selected role that are unprocessed, or in other words, for which some or all of steps 2214 through 2228 have not been performed. If it is determined that there is at least one unprocessed device, then the process 2200 proceeds to block 2214, wherein one of the at least one unprocessed devices is selected.

At block 2216, the rendering engine 1856 reads the data file, and specifically reads the role, vendor, and/or model from the data file for the selected device. In some embodiments, this can include identifying a section of the data file, and specifically of the dictionary object for the selected device, which section can be the Hostvar section. From this section of the data file, the role, vendor, and/or model can be read for the selected device. At block 2218, services and/or service dictionaries can be read from the data file. In other words at least one service associated with the selected device can be identified based on the data file, and more specifically based on the device dictionary object of the selected device. These services and/or service dictionaries can describe one or several features, functions, and/or functionalities of the selected device. These services and/or service dictionaries can be read from the Hostvar section of the data file of the device. One example of a service dictionary from the data file is reproduced below. In this example, each of "vlans" and "vrfs" are a service.

```
"vlans": [
    {
        "name": "isp-vr",
        "vlan_id": 10
    },
  {
        "name": "us2-oss-v620",
        "vlan_id": 620
  }
],
"vrfs": [
    {
        "bgp_peers": [
          {
            "address": "10.86.53.82",
            "as": 64691
          },
          {
            "address": "10.86.53.83",
            "as": 64691
          }
        ],
        "interfaces": [
          "irb.10"
        ],
        "name": "isp-vr",
        "rd": "65002:001001001",
        "rt_export": [
          "65002:001001001",
          "65001:001001001"
        ],
        "rt_import": [
          "65002:001001001"
          "65001:001001001"
        ],
        "vlans": [
          10
        ]
    },
```

The role, vendor, model, a service information can form a key and/or can be identified as a key as indicated in block 2220. These keys can be used to lookup one or several templates as shown in block 2222, which can comprise one or several plugins. In some embodiments, these keys can be used to query the configuration database 1850 for one or several templates associated with the keys. In some embodiments, the configuration database 1850 may, as shown below, include information linking keys with plugins.

| Vendor | Role | Model | Service | Plugin |
|---|---|---|---|---|
| Juniper | leaf | Qfx5k | Vlan | Junos_vlan.j2 |
| . . . | . . . | . . . | . . . | . . . |
| cisco | dci | Nexus9k | Interface | Cisco_interface.j2 |

The templates and/or plugins identified in block 2222 can be retrieved and run, as indicated in block 2224. In some embodiments, the running of the templates and/or plugins can include the identification of information, which can be one or several variables, within the dictionary object of the selected device relevant to a template and/or plugin, and passing this information to the template and/or plugin. In other words, information for use by the plugin can be identified in the data file and input into the plugin and/or ingested by the plugin. This can be repeated for each identified template and/or plugin such that each template and/or plugin has the information needed for running. This information can be used as arguments within the script of the template and/or plugin.

The running of the plugin and/or template with information input from the data file can result in the generation of a configuration snippet, also referred to herein as a configuration file segment. In some embodiments, a configuration snippet can comprise a portion of a configuration file for a device. In some embodiments, the plugin can output a configuration file segment relevant to the service selected and used as key to identify the plugin for the selected device. The above steps of reading a service, identifying a key based in part on the service, identifying an associated plugin, and generating a configuration snippet by running of that plugin can be repeated, and in some embodiments, can be iteratively repeated for each service of the selected device.

As indicated in block 2226, the running of plugins for each identified service of the selected device can generate a configuration snippet for each service. As indicated in block 2228 the configuration snippets for the selected device can be merged and/or aggregated. This can be performed, as discussed above, according to aggregation logic to thereby form a configuration file for the selected device. In some embodiments, this configuration file can These configuration snippets for the This can result in the creation of a plurality of configuration snippets for the selected device, which together can form a low level configuration file.

The process can return again to decision step 2212, wherein it is determined if there are any additional unprocessed devices in the selected role. If there are any unprocessed devices, then the process 2200 repeats steps 2214 through 2228 until all of the devices have been processed, or in other words, until configuration snippets have been generated for all of the devices associated with the selected role.

If it is determined that there are no unprocessed devices, then the process 2200 returns to decision step 2206, wherein it is determined if there are any unprocessed role. If there are any unprocessed roles, than a next unprocessed role is selected, and the process proceeds as outlined above.

If it is determined that there are no remaining, unprocessed roles, then the process 2200 proceeds to block 2230, wherein any unmerged configuration snippets and/or any multiple configuration files or file segments are identified for each device. At block 2232, any unmerged configuration snippets and/or any multiple configuration files or file segments for each device are merged to form a single configuration file. The configuration file for each device can be stored in the configuration database 1850, and can, in some embodiments, be stored in the format <device name>.conf.

Example

The following are examples of code that could be used in the generation of a configuration file. The first example is for a Juniper device. Below is an example of a portion of a JSON datafile for interface configuration of a Juniper device.

```
"interfaces": [
{
"dc": "None",
"description": "compute-u2",
"enabled": true,
"env": "None",
"id": 0,
"mode": "access",
"name": "ae0",
"parent": "None",
"subint": 0,
"type": "aggregate",
"unit": "None",
"vlan_list": [10]
,
```

-continued

```
{
"dc": "dc2",
"description": "dc1-c1u1-spine-2 - et-0/0/0",
"enabled": false,
"env": "uspp1",
"id": 1,
"ipv4__addr": ["172.17.192.89/31"],
"link__id": 37,
"mode": "l3",
"mpls__enabled": true,
"name": "et-0/0/1",
"parent": "None",
"subint": 0,
"type": "physical",
"unit": "c1u1"
}
]
```

An exemplary template is shown below. This is an exemplary jinja template that can be used to generate device configuration for Juniper devices. This template can use information from the data file shown above.

```
{% if interfaces|selectattr('type', 'equalto',
'physical')|rejectattr('mode', 'equalto', 'vc-
port')|list %}
interfaces {
{% for interface in interfaces if (interface.mode != 'vc-port' and
interface.type ==
'physical') %}
{% if interface.vc__name is defined %}
   {{ interface.vc__name }} {
{% else %}
   {{ interface.name }} {
{% endif %}
{% if interface.subint != 0 and interface.mode == 'l3' %}
vlan-tagging;
{% endif %}
{% if interface.ethernet__mtu is defined and interface.mode !=
'aggregate' %}
mtu {{ interface.ethernet__mtu }};
{% elif ethernet__mtu is defined and interface.mode != 'aggregate' %}
mtu {{ ethernet__mtu }};
{% endif %}
{% if interface.description is defined and interface.description !=
'None' %}
description "{{ interface.description }}";
{% endif %}
{% if interface.enabled is defined and not interface.enabled %}
disable;
{% endif %}
{% if interface.speed is defined %}
speed {{ interface.speed }};
{% endif %}
{% if interface.duplex is defined and interface.duplex == 'full' %}
link-mode full-duplex;
{% endif %}
{% if interface.holdtime is defined %}
hold-time up {{ interface.holdtime }} down {{ interface.holdtime }};
{% endif %}
{% if interface.mode == 'trunk' %}
native-vlan-id {{ interface.native__vlan }};
{% endif %}
{# The next section deals with auto-negotiation. It is on by default but
not in the config. #}
{# It is required to be called out for trunk, access and aggregate links
but optional elsewhere #}
{# It can be overridden on all physical interfaces except LACP
aggregate members #}
{# It is required for LACP links and so cannot be overridden, hence
we ignore the computed value #}
{# Note that 'undefined' == true #}
{% set ns = {'autoneg': 'undefined'} %}
{% if (interface.mode == 'trunk' or interface.mode == 'access') %}
{% set __ = ns.update({'autoneg': true}) %}
{% endif %}
```

-continued

```
{% if interface.autoneg is defined and interface.autoneg %}
{% set __ = ns.update({'autoneg': true}) %}
{% elif interface.autoneg is defined and not interface.autoneg %}
{% set __ = ns.update({'autoneg': false}) %}
{% endif %}
{# Now continue the template and substituate as required #}
{% if interface.mode is defined and (interface.mode != 'None' and
interface.mode != 'aggregate') %}
{% if not ns.autoneg %}
{% if model == 'qfx5100-48-6q' or model == 'qfx10002-36q' or
model == 'qfx10002-72q' %}
ether-options {
{% else %}
gigether-options {
{% endif %}
no-auto-negotiation;
}
{% elif interface.mode != 'aggregate' and ns.autoneg and ns.autoneg
!= 'undefined' %}
{% if model == 'qfx5100-48-6q' or model == 'qfx10002-36q' or
model == 'qfx10002-72q' %}
ether-options {
{% else %}
gigether-options {
{% endif %}
auto-negotiation;
}
{% endif %}
{# end dealing with auto-negotiation (except for the ignored bit below
for aggregate members) #}
unit {{ interface.subint }} {
{% if interface, subint != 0 and interface.mode == 'l3' %}
vlan-id {{ interface.subint }}
{% endif %}
{% if interface.mode == 'l3' %}
family inet {
{% if interface.rpf__check is defined %}
{% if interface.rpf__check %}
   rpf-check {
      mode loose;
   }
{% endif %}
{% endif %}
{% for ip in interface.ipv4__addr %}
   address {{ ip }};
{% endfor %}
{% if interface.ip__mtu is defined %}
   mtu {{ interface.ip__mtu }};
{% elif ip__mtu is defined %}
   mtu {{ ip__mtu }};
{% endif %}
   }
{% endif %}
{% if interface.mpls__enabled is defined and interface.mpls__enabled
%}
   {% if interface.mpls__mtu is defined %}family mpls { {% elif
mpls__mtu is defined%)} family mpls { {%
else %}family mpls; {% endif %}
   {% if interface.mpls__mtu is defined %} mtu {{
interface.mpls__mtu }}; {% elif mpls__mtu is defined%)} {{
mpls__mtu }}; {% endif %}
   {% if interface.mpls__mtu is defined %}} {% elif mpls__mtu is
defined %)}} {% endif %}
{% endif %}
{% if interface.mode == 'trunk' or interface.mode == 'access' %}
   family ethernet-switching {
   interface-mode {{ interface.mode }};
{% if interface.vlan__list is defined %}
   vlan {
   members [{% for vlan in interface.vlan__list %} {{ vlan }}{%
   endfor %} ];
   }
{% endif %}
   }
{% endif %}
   }
```

-continued

```
{% elif interface.mode == 'aggregate' %}
{% if model == 'qfx5100-48-6q' %}
  ether-options {
{% else %}
  gigether-options {
{% endif %}
  auto-negotiation;
  802.3ad {
{% if interface.force__up is defined and interface.force__up == true %}
  lacp {
  force-up;
  }
{% endif %}
     {{ interface.parent }};
  }
}
{% endif %}
}
{% endfor %}
}
{% endif %}
```

Running the above template with the information from the above data file segment can result in the generation of the following configuration snippet for a Juniper switch.

```
interfaces {
ae0 {
aggregated-ether-options {
lacp {
active;
}
}
description "compute-u2";
mtu 9192;
unit 0 {
family ethernet-switching {
interface-mode access;
vlan {
members [ 10 ];
}
}
}
et-0/0/1 {
mtu 9192;
description "ord12-c1u1-spine-2 - et-0/0/0";
disable;
unit 0 {
family inet {
address 172.17.192.89/31;
}
family mpls; }
}
}
```

Example

The following example is for a Cisco device. Below is an example of a portion of a JSON datafile for interface configuration of a Cisco device.

```
interface:
- name: "Hu0/0/0/22"
ip: 192.168.1.8
peer: "dc1-pibr-rtr-1__et-2/1/0"
description: "description"
```

An exemplary template is shown below. This is an exemplary jinja template that can be used to generate low level interface configuration for Cisco devices. This template can use information from the data file shown for the Cisco device above.

```
interface Loopback0
ipv4 address {{ loopback }} 255.255.255.255
{% if enabled %}
no shutdown
{% endif %}
!
{% for int in interface %}
interface {{ int.name }}
description {{ int.peer }}
{# no shutdown all links #}
{% if int.enabled is defined and not int.enabled %}
shutdown
{% else %}
no shutdown
{% endif %}
{# aggregate members must have a parent #}
{% if int.parent is defined %}
bundle id {{int.parent}} mode active
{# else we have a L3 interface #}
{% else %}
{% if int.ethernet__mtu is defined %}
mtu {{ int.ethernet__mtu }}
{% else %}
mtu {{ ethernet__mtu|default('9192') }}
{% endif %}
{% if int.ip__mtu is defined %}
ipv4 mtu {{ int.ip__mtu }}
{% else %}
ipv4 mtu {{ ip__mtu|default('9170') }}
{% endif %}
ipv4 address {{ int.ip }} 255.255.255.254
{# add config for BFD if needed #}
{% if int.bfd__neighbor is defined %}
bfd mode ietf
bfd address-family ipv4 destination {{ int.bfd__neighbor }}
bfd address-family ipv4 fast-detect
{% endif %}
{% endif %}
!
{% endfor %}
{% if breakout is defined %}
{% for controller in breakout %}
controller Optics{{ controller }}
breakout 4x10
{% endfor %}
{% endif %}
```

Running the above template for Cisco devices with the information from the above data file segment for the Cisco device can result in the generation of the following configuration snippet for a Cisco switch.

```
interface Hu0/0/0/22
description dc1-pibr-rtr-1__et-2/1/0
no shutdown
mtu 9192
ipv4 mtu 9170
ipv4 address 192.168.1.8 255.255.255.254
!
```

Exemplary Implementation

Figure 17:
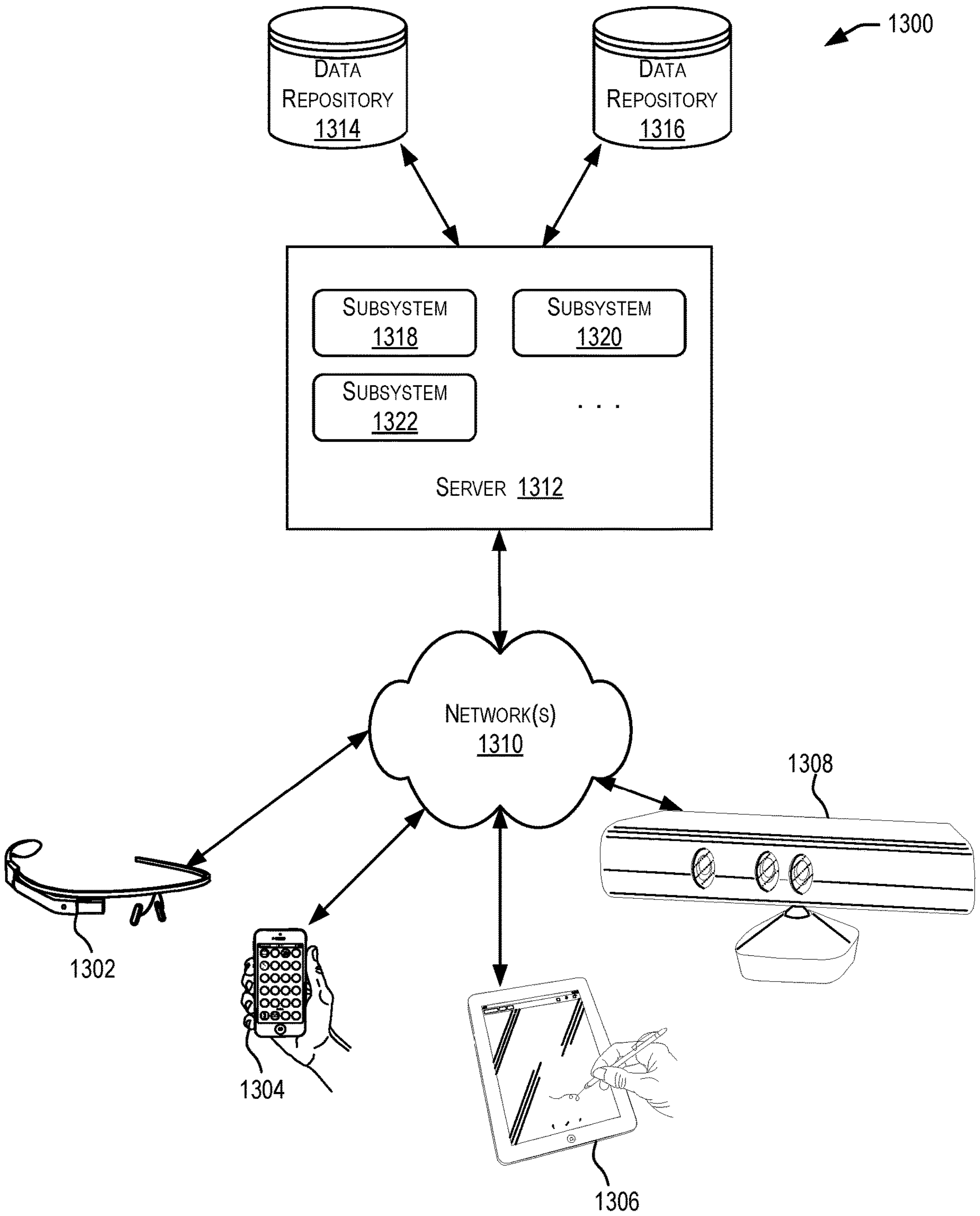
FIG. 17 depicts a simplified diagram of a distributed system for implementing an embodiment.

FIG. 17 depicts a simplified diagram of a distributed system 1300 for implementing an embodiment. In the illustrated embodiment, distributed system 1300 includes one or more client computing devices 1302, 1304, 1306, and 1308, coupled to a server 1312 via one or more communication networks 1310. Clients computing devices 1302, 1304, 1306, and 1308 may be configured to execute one or more applications.

In various embodiments, server 1312 may be adapted to run one or more services or software applications that enable the processing described in this disclosure.

In certain embodiments, server 1312 may also provide other services or software applications that can include non-virtual and virtual environments. In some embodiments, these services may be offered as web-based or cloud services, such as under a Software as a Service (SaaS) model to the users of client computing devices 1302, 1304, 1306, and/or 1308. Users operating client computing devices 1302, 1304, 1306, and/or 1308 may in turn utilize one or more client applications to interact with server 1312 to utilize the services provided by these components.

In the configuration depicted in FIG. 17, server 1312 may include one or more components 1318, 1320 and 1322 that implement the functions performed by server 1312. These components may include software components that may be executed by one or more processors, hardware components, or combinations thereof. It should be appreciated that various different system configurations are possible, which may be different from distributed system 1300. The embodiment shown in FIG. 17 is thus one example of a distributed system for implementing an embodiment system and is not intended to be limiting.

Users may use client computing devices 1302, 1304, 1306, and/or 1308 to interact with server 1312 in accordance with the teachings of this disclosure. A client device may provide an interface that enables a user of the client device to interact with the client device. The client device may also output information to the user via this interface. Although FIG. 13 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 1310 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 1310 can be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 1312 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1312 can include one or more virtual machines running virtual operating systems, or other computing architectures involving virtualization such as one or more flexible pools of logical storage devices that can be virtualized to maintain virtual storage devices for the server. In various embodiments, server 1312 may be adapted to run one or more services or software applications that provide the functionality described in the foregoing disclosure.

The computing systems in server 1312 may run one or more operating systems including any of those discussed above, as well as any commercially available server operating system. Server 1312 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 1312 may include one or more applications to analyze and consolidate data feeds and/or event updates received from users of client computing devices 1302, 1304, 1306, and 1308. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 1312 may also include one or more applications to display the data feeds and/or real-time events via one or more display devices of client computing devices 1302, 1304, 1306, and 1308.

Distributed system 1300 may also include one or more data repositories 1314, 1316. These data repositories may be used to store data and other information in certain embodiments. For example, one or more of the data repositories 1314, 1316 may be used to store data or information generated by the processing described herein and/or data or information used for the processing described herein. Data repositories 1314, 1316 may reside in a variety of locations. For example, a data repository used by server 1312 may be local to server 1312 or may be remote from server 1312 and in communication with server 1312 via a network-based or dedicated connection. Data repositories 1314, 1316 may be of different types. In certain embodiments, a data repository used by server 1312 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of data repositories 1314, 1316 may also be used by applications to store application data. The data repositories used by applications may be of different types such as, for example, a key-value store repository, an object store repository, or a general storage repository supported by a file system.

Figure 18:
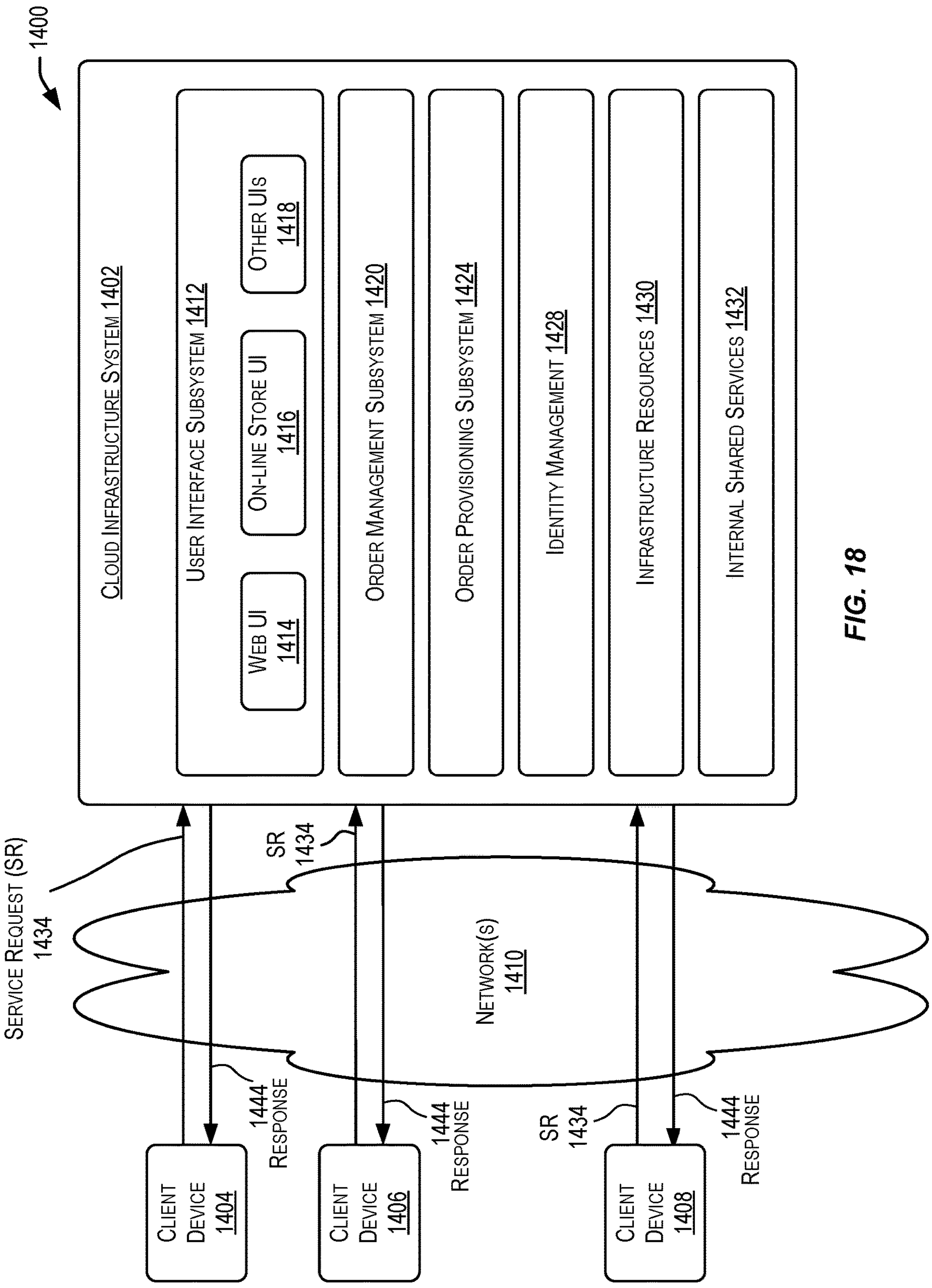
FIG. 18 is a simplified block diagram of a cloud-based system environment offering cloud services, in accordance with certain embodiments.

In certain embodiments, the functionalities described in this disclosure may be offered as services via a cloud environment. FIG. 18 is a simplified block diagram of a cloud-based system environment in which functionalities described herein may be offered as cloud services, in accordance with certain embodiments. In the embodiment depicted in FIG. 18, cloud infrastructure system 1402 may provide one or more cloud services that may be requested by users using one or more client computing devices 1404, 1406, and 1408. Cloud infrastructure system 1402 may comprise one or more computers and/or servers that may include those described above for server 1312. The computers in cloud infrastructure system 1402 may be organized as general purpose computers, specialized server computers, server farms, server clusters, or any other appropriate arrangement and/or combination.

Network(s) 1410 may facilitate communication and exchange of data between clients 1404, 1406, and 1408 and cloud infrastructure system 1402. Network(s) 1410 may include one or more networks. The networks may be of the same or different types. Network(s) 1410 may support one or more communication protocols, including wired and/or wireless protocols, for facilitating the communications.

The embodiment depicted in FIG. 18 is only one example of a cloud infrastructure system and is not intended to be limiting. It should be appreciated that, in some other embodiments, cloud infrastructure system 1402 may have more or fewer components than those depicted in FIG. 18, may combine two or more components, or may have a different configuration or arrangement of components. For example, although FIG. 18 depicts three client computing devices, any number of client computing devices may be supported in alternative embodiments.

The term cloud service is generally used to refer to a service that is made available to users on demand and via a communication network such as the Internet by systems (e.g., cloud infrastructure system 1402) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain embodiments, cloud infrastructure system 1402 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1402 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1402. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1402. Cloud infrastructure system 1402 then performs processing to provide the services requested in the customer's subscription order. Cloud infrastructure system 1402 may be configured to provide one or even multiple cloud services.

Cloud infrastructure system 1402 may provide the cloud services via different deployment models. In a public cloud model, cloud infrastructure system 1402 may be owned by a third party cloud services provider and the cloud services are offered to any general public customer, where the customer can be an individual or an enterprise. In certain other embodiments, under a private cloud model, cloud infrastructure system 1402 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1402 and the services provided may be shared by several organizations in a related community. Various other models such as hybrids of the above mentioned models may also be used.

Client computing devices 1404, 1406, and 1408 may be of different types (such as devices 1302, 1304, 1306, and 1308 depicted in FIG. 17) and may be capable of operating one or more client applications. A user may use a client device to interact with cloud infrastructure system 1402, such as to request a service provided by cloud infrastructure system 1402.

In some embodiments, the processing performed by cloud infrastructure system 1402 may involve big data analysis. This analysis may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 18, cloud infrastructure system 1402 may include infrastructure resources 1430 that are utilized for facilitating the provision of various cloud services offered by cloud infrastructure system 1402. Infrastructure resources 1430 may include, for example, processing resources, storage or memory resources, networking resources, and the like.

In certain embodiments, to facilitate efficient provisioning of these resources for supporting the various cloud services provided by cloud infrastructure system 1402 for different customers, the resources may be bundled into sets of resources or resource modules (also referred to as "pods"). Each resource module or pod may comprise a pre-integrated and optimized combination of resources of one or more types. In certain embodiments, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 1402 may itself internally use services 1432 that are shared by different components of cloud infrastructure system 1402 and which facilitate the provisioning of services by cloud infrastructure system 1402. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 1402 may comprise multiple subsystems. These subsystems may be implemented in software, or hardware, or combinations thereof. As depicted in FIG. 18, the subsystems may include a user interface subsystem 1412 that enables users or customers of cloud infrastructure system 1402 to interact with cloud infrastructure system 1402. User interface subsystem 1412 may include various different interfaces such as a web interface 1414, an online store interface 1416 where cloud services provided by cloud infrastructure system 1402 are advertised and are purchasable by a consumer, and other interfaces 1418. For example, a customer may, using a client device, request (service request 1434) one or more services provided by cloud infrastructure system 1402 using one or more of interfaces 1414, 1416, and 1418. For example, a customer may access the online store, browse cloud services offered by cloud infrastructure system 1402, and place a subscription order for one or more services offered by cloud infrastructure system 1402 that the customer wishes to subscribe to. The service request may include information identifying the customer and one or more services that the customer desires to subscribe to.

In certain embodiments, such as the embodiment depicted in FIG. 18, cloud infrastructure system 1402 may comprise an order management subsystem (OMS) 1420 that is configured to process the new order. As part of this processing, OMS 1420 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 1420 may then invoke the order provisioning subsystem (OPS) 1424 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 1424 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1402 may send a response or notification 1444 to the requesting customer to indicate when the requested service is now ready for use. In some instances, information (e.g., a link) may be sent to the customer that enables the customer to start using and availing the benefits of the requested services.

Cloud infrastructure system 1402 may provide services to multiple customers. For each customer, cloud infrastructure system 1402 is responsible for managing information related to one or more subscription orders received from the customer, maintaining customer data related to the orders, and providing the requested services to the customer. Cloud infrastructure system 1402 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1402 may provide services to multiple customers in parallel. Cloud infrastructure system 1402 may store information for these customers, including possibly proprietary information. In certain embodiments, cloud infrastructure system 1402 comprises an identity management subsystem (IMS) 1428 that is configured to manage customers information and provide the separation of the managed information such that information related to one customer is not accessible by another customer. IMS 1428 may be configured to provide various security-related services such as identity services, such as information access management, authentication and authorization services, services for managing customer identities and roles and related capabilities, and the like.

Figure 19:
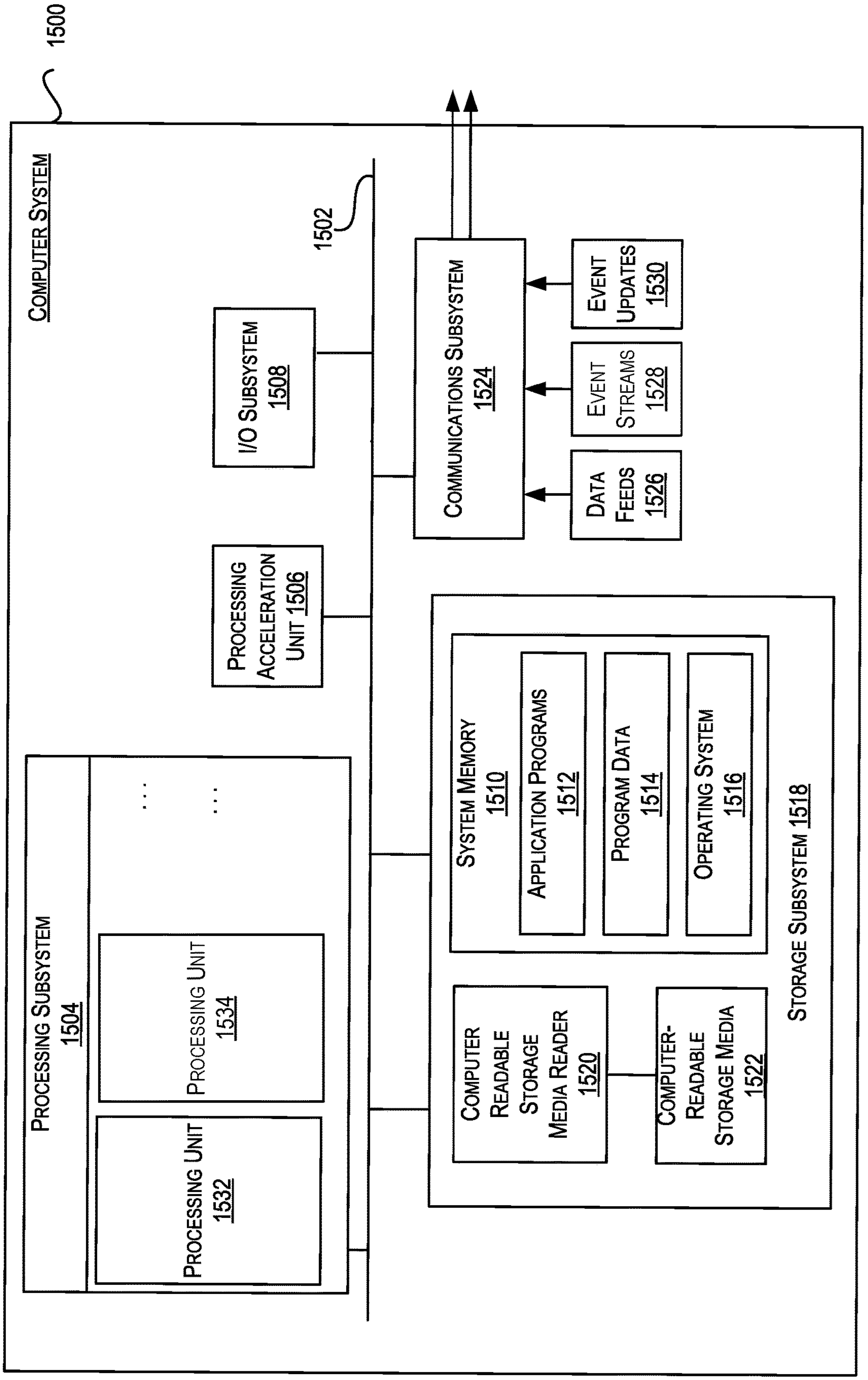
FIG. 19 illustrates an exemplary computer system that may be used to implement certain embodiments.

FIG. 19 illustrates an exemplary computer system 1500 that may be used to implement certain embodiments. For example, in some embodiments, computer system 1500 may be used to implement any of the system and subsystems for performing processing according to the present disclosure. As shown in FIG. 19, computer system 1500 includes various subsystems including a processing subsystem 1504 that communicates with a number of other subsystems via a bus subsystem 1502. These other subsystems may include a processing acceleration unit 1506, an I/O subsystem 1508, a storage subsystem 1518, and a communications subsystem 1524. Storage subsystem 1518 may include non-transitory computer-readable storage media including storage media 1522 and a system memory 1510.

Bus subsystem 1502 provides a mechanism for letting the various components and subsystems of computer system 1500 communicate with each other as intended. Although bus subsystem 1502 is shown schematically as a single bus, alternative embodiments of the bus subsystem may utilize multiple buses. Bus subsystem 1502 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1504 controls the operation of computer system 1500 and may comprise one or more processors, application specific integrated circuits (ASICs), or field programmable gate arrays (FPGAs). The processors may include be single core or multicore processors. The processing resources of computer system 1500 can be organized into one or more processing units 1532, 1534, etc. A processing unit may include one or more processors, one or more cores from the same or different processors, a combination of cores and processors, or other combinations of cores and processors. In some embodiments, processing subsystem 1504 can include one or more special purpose co-processors such as graphics processors, digital signal processors (DSPs), or the like. In some embodiments, some or all of the processing units of processing subsystem 1504 can be implemented using customized circuits, such as application specific integrated circuits (ASICs), or field programmable gate arrays (FPGAs).

In some embodiments, the processing units in processing subsystem 1504 can execute instructions stored in system memory 1510 or on computer readable storage media 1522. In various embodiments, the processing units can execute a variety of programs or code instructions and can maintain multiple concurrently executing programs or processes. At any given time, some or all of the program code to be executed can be resident in system memory 1510 and/or on computer-readable storage media 1522 including potentially on one or more storage devices. Through suitable programming, processing subsystem 1504 can provide various functionalities described above. In instances where computer system 1500 is executing one or more virtual machines, one or more processing units may be allocated to each virtual machine.

In certain embodiments, a processing acceleration unit 1506 may optionally be provided for performing customized processing or for off-loading some of the processing performed by processing subsystem 1504 so as to accelerate the overall processing performed by computer system 1500.

I/O subsystem 1508 may include devices and mechanisms for inputting information to computer system 1500 and/or for outputting information from or via computer system 1500. In general, use of the term input device is intended to include all possible types of devices and mechanisms for inputting information to computer system 1500. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 1500 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1518 provides a repository or data store for storing information and data that is used by computer system 1500. Storage subsystem 1518 provides a tangible non-transitory computer-readable storage medium for storing the basic programming and data constructs that provide the functionality of some embodiments. Storage subsystem 1518 may store software (e.g., programs, code modules, instructions) that when executed by processing subsystem 1504 provides the functionality described above. The software may be executed by one or more processing units of processing subsystem 1504. Storage subsystem 1518 may also provide a repository for storing data used in accordance with the teachings of this disclosure.

Storage subsystem 1518 may include one or more non-transitory memory devices, including volatile and non-volatile memory devices. As shown in FIG. 19, storage subsystem 1518 includes a system memory 1510 and a computer-readable storage media 1522. System memory 1510 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1500, such as during start-up, may typically be stored in the ROM. The RAM typically contains data and/or program modules that are presently being operated and executed by processing subsystem 1504. In some implementations, system memory 1510 may include multiple different types of memory, such as static random access memory (SRAM), dynamic random access memory (DRAM), and the like.

By way of example, and not limitation, as depicted in FIG. 19, system memory 1510 may load application programs 1512 that are being executed, which may include various applications such as Web browsers, mid-tier applications, relational database management systems (RDBMS), etc., program data 1514, and an operating system 1516. By way of example, operating system 1516 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 1522 may store programming and data constructs that provide the functionality of some embodiments. Computer-readable media 1522 may provide storage of computer-readable instructions, data structures, program modules, and other data for computer system 1500. Software (programs, code modules, instructions) that, when executed by processing subsystem 1504 provides the functionality described above, may be stored in storage subsystem 1518. By way of example, computer-readable storage media 1522 may include non-volatile memory such as a hard disk drive, a magnetic disk drive, an optical disk drive such as a CD ROM, DVD, a Blu-Ray® disk, or other optical media. Computer-readable storage media 1522 may include, but is not limited to, Zip® drives, flash memory cards, universal serial bus (USB) flash drives, secure digital (SD) cards, DVD disks, digital video tape, and the like. Computer-readable storage media 1522 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1518 may also include a computer-readable storage media reader 1520 that can further be connected to computer-readable storage media 1522. Reader 1520 may receive and be configured to read data from a memory device such as a disk, a flash drive, etc.

In certain embodiments, computer system 1500 may support virtualization technologies, including but not limited to virtualization of processing and memory resources. For example, computer system 1500 may provide support for executing one or more virtual machines. In certain embodiments, computer system 1500 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1500. Accordingly, multiple operating systems may potentially be run concurrently by computer system 1500.

Communications subsystem 1524 provides an interface to other computer systems and networks. Communications subsystem 1524 serves as an interface for receiving data from and transmitting data to other systems from computer system 1500. For example, communications subsystem 1524 may enable computer system 1500 to establish a communication channel to one or more client devices via the Internet for receiving and sending information from and to the client devices.

Communication subsystem 1524 may support both wired and/or wireless communication protocols. For example, in certain embodiments, communications subsystem 1524 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.XX family standards, or other mobile communication technologies, or any combination thereof), global positioning system (GPS) receiver components, and/or other components. In some embodiments communications subsystem 1524 can provide wired network connectivity (e.g., Ethernet) in addition to or instead of a wireless interface.

Communication subsystem 1524 can receive and transmit data in various forms. For example, in some embodiments, in addition to other forms, communications subsystem 1524 may receive input communications in the form of structured and/or unstructured data feeds 1526, event streams 1528, event updates 1530, and the like. For example, communications subsystem 1524 may be configured to receive (or send) data feeds 1526 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1524 may be configured to receive data in the form of continuous data streams, which may include event streams 1528 of real-time events and/or event updates 1530, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1524 may also be configured to communicate data from computer system 1500 to other computer systems or networks. The data may be communicated in various different forms such as structured and/or unstructured data feeds 1526, event streams 1528, event updates 1530, and the like to one or more databases that may be in communication with one or more streaming data source computers coupled to computer system 1500.

Computer system 1500 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1500 depicted in FIG. 19 is intended only as a specific example. Many other configurations having more or fewer components than the system depicted in FIG. 19 are possible. Based on the disclosure and teachings provided herein, a person of ordinary skill in the art will appreciate other ways and/or methods to implement the various embodiments.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques including but not limited to conventional techniques for inter-process communications, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A method comprising:

receiving data characterizing a plurality of devices in a computing network;

generating with an inventory processor a data file characterizing each of the plurality of devices in the computing network, the data file generated based on the received data and on a set of static overrides;

generating a configuration file for each of the plurality of devices in the computing network via iterative selection and application of templates to portions of the data file, wherein generating the configuration file for each of the plurality of devices in the computing network via iterative selection and application of templates to portions of the data file comprises:

identifying roles identified in the data file;

for each role identified in the data file, identifying devices associated with the identified role;

selecting one of the identified devices associated with the identified role;

identifying based on the data file at least one service associated with the selected one of the identified devices associated with the identified role;

retrieving a plugin linked with the identified at least one service associated with the selected one of the identified devices associated with the identified role;

ingesting information from the data file into the plugin; and outputting a configuration file segment relevant to the at least one service associated with the selected one of the identified devices associated with the identified role from the plugin; and building and deploying the computing network based on the generated configuration files.

2. The method of claim 1, wherein the data characterizing the plurality of devices in the computing network is received from a plurality of databases.

3. The method of claim 1, wherein the data characterizing the plurality of devices in the computing network characterizes a topology of the computing network.

4. The method of claim 1, wherein the computing network comprises a Clos network.

5. The method of claim 1, wherein the data file characterizing each of the plurality of devices in the computing network comprises a JSON file.

6. The method of claim 1, wherein generating the data file characterizing each of the plurality of devices in the computing network comprises:

extracting portions of the received data relevant to one of the plurality of devices in the computing network; and generating a dictionary object for the one of the plurality of devices in the computing network.

7. The method of claim 6, wherein generating the data file characterizing each of the plurality of devices in the computing network further comprises:

identifying at least one of the set of static overrides relevant to the one of the plurality of devices in computing network; and merging the dictionary object for the one of the plurality of devices in the computing network with the at least one of the set of static overrides.

8. The method of claim 7, wherein the set of static overrides comprises at least one of:

a group override; and a device override.

9. The method of claim 8, wherein the group override is applicable to a plurality of devices in the computing network belonging to a common group.

10. The method of claim 8, wherein the device override is relevant to one device within the computing network.

11. The method of claim 8, wherein the device override overwrites portions of the dictionary object when the device override conflicts with the group override.

12. The method of claim 7, wherein generating the configuration file for each of the plurality of devices in the computing network via iterative selection and application of templates to portions of the data file further comprises generating a configuration file for each of the identified devices associated with the identified role.

13. The method of claim 12, wherein generating the configuration file for each of the identified devices associated with the identified role further comprises:

identifying a plurality of configuration file segments relevant to the selected one of the identified devices associated with the identified role; and merging the plurality of configuration file segments to form the configuration file.

14. A non-transitory computer-readable storage medium storing a plurality of instructions executable by one or more processors, the plurality of instructions when executed by the one or more processors cause the one or more processors to:

receive data characterizing a plurality of devices in a computing network;

generate with an inventory processor a data file characterizing each of the plurality of devices in the computing network, the data file generated based on the received data and on a set of static overrides;

generate a configuration file for each of the plurality of devices in the computing network via iterative selection and application of templates to portions of the data file, wherein generating the configuration file for each of the plurality of devices in the computing network via iterative selection and application of templates to portions of the data file comprises:

identifying roles identified in the data file;

for each role identified in the data file, identifying devices associated with the identified role;

selecting one of the identified devices associated with the identified role;

identifying based on the data file at least one service associated with the selected one of the identified devices associated with the identified role;

retrieving a plugin linked with the identified at least one service associated with the selected one of the identified devices associated with the identified role;

ingesting information from the data file into the plugin; and outputting a configuration file segment relevant to the at least one service associated with the selected one of the identified devices associated with the identified role from the plugin; and build and deploy the computing network based on the generated configuration files.

15. The non-transitory computer-readable storage medium of claim 14, wherein generating the data file characterizing each of the plurality of devices in the computing network comprises:

extracting portions of the received data relevant to one of the plurality of devices in the computing network; and generating a dictionary object for the one of the plurality of devices in the computing network.

16. The non-transitory computer-readable storage medium of claim 15, wherein generating the data file characterizing each of the plurality of devices in the computing network further comprises:

identifying at least one of the set of static overrides relevant to the one of the plurality of devices in computing network; and merging the dictionary object for the one of the plurality of devices in the computing network with the at least one of the set of static overrides.

17. A system comprising:

a memory comprising a configuration database; and a processor configured to:

receive data characterizing a plurality of devices in a computing network;

generate with an inventory processor a data file characterizing each of the plurality of devices in the computing network, the data file generated based on the received data and on a set of static overrides;

generate a configuration file for each of the plurality of devices in the computing network via iterative selection and application of templates to portions of the data file, wherein generating the configuration file for each of the plurality of devices in the computing network via iterative selection and application of templates to portions of the data file comprises:

identifying roles identified in the data file;

for each role identified in the data file, identifying devices associated with the identified role;

selecting one of the identified devices associated with the identified role;

identifying based on the data file at least one service associated with the selected one of the identified devices associated with the identified role;

retrieving a plugin linked with the identified at least one service associated with the selected one of the identified devices associated with the identified role;

ingesting information from the data file into the plugin; and outputting a configuration file segment relevant to the at least one service associated with the selected one of the identified devices associated with the identified role from the plugin;

build and deploy the computing network based on the generated configuration files.

18. The system of claim 17, wherein generating the data file characterizing each of the plurality of devices in the computing network comprises:

extracting portions of the received data relevant to one of the plurality of devices in the computing network;

generating a dictionary object for the one of the plurality of devices in the computing network;

identifying at least one of the set of static overrides relevant to the one of the plurality of devices in computing network; and merging the dictionary object for the one of the plurality of devices in the computing network with the at least one of the set of static overrides.

* * * * *

UNITED STATES PATENT AND TRADEMARK OFFICE

CERTIFICATE OF CORRECTION

PATENT NO. : 11,811,610 B2
APPLICATION NO. : 17/146191
DATED : November 7, 2023
INVENTOR(S) : Mutnuru et al.

It is certified that error appears in the above-identified patent and that said Letters Patent is hereby corrected as shown below:

In the Drawings

On sheet 8 of 19, in FIG. 8, under Reference Numeral 806, Line 3, delete “Loobacks” and insert -- Loopbacks --, therefor.

In the Specification

In Column 8, Lines 18-19, delete “In some embodiments, In some embodiments,” and insert -- In some embodiments, --, therefor.

In Column 22, Line 36, delete “looback” and insert -- loopback --, therefor.

In the Claims

In Column 60, Line 49, in Claim 17, after “plugin;” insert -- and --, therefor.

Signed and Sealed this
Eighteenth Day of June, 2024

Katherine Kelly Vidal

Katherine Kelly Vidal
*Director of the United States Patent and Trademark Office*